US007533049B2

(12) United States Patent
Sato

(10) Patent No.: US 7,533,049 B2
(45) Date of Patent: May 12, 2009

(54) METHOD AND SYSTEM FOR RATING SECURITIES, METHOD AND SYSTEM FOR EVALUATING PRICE OF SECURITIES, METHOD FOR ESTABLISHING A MARKET WITH THE SYSTEM

(76) Inventor: Michihiro Sato, 12-7-2-082, Gobancho, Chiyoda-ku, Tokyo (JP) 102-0076

( * ) Notice: Subject to any disclaimer, the term of this patent is extended or adjusted under 35 U.S.C. 154(b) by 406 days.

(21) Appl. No.: 11/150,367

(22) Filed: Jun. 13, 2005

(65) Prior Publication Data

US 2005/0251475 A1 Nov. 10, 2005

Related U.S. Application Data

(63) Continuation-in-part of application No. 10/444,870, filed on May 23, 2003, now abandoned, and a continuation-in-part of application No. 10/376,358, filed on Feb. 27, 2003, now abandoned, and a continuation-in-part of application No. 10/358,432, filed on Feb. 4, 2003, now abandoned, and a continuation-in-part of application No. 10/233,995, filed on Aug. 30, 2002, now abandoned.

(30) Foreign Application Priority Data

| May 31, 2000 | (JP) | ............................ 2002-158595 |
| Sep. 3, 2001 | (JP) | ............................ 2001-265178 |
| Feb. 5, 2002 | (JP) | ............................ 2002-27550 |
| Feb. 27, 2002 | (JP) | ............................ 2002-51085 |
| Mar. 11, 2002 | (JP) | ............................ 2002-65123 |
| Sep. 3, 2002 | (JP) | ............................ 2002-257497 |
| Feb. 4, 2003 | (JP) | ............................ 2003-27127 |

(51) Int. Cl.
*G06Q 40/00* (2006.01)

(52) U.S. Cl. .................................................. 705/36 R

(58) Field of Classification Search ............... 705/35–38
See application file for complete search history.

(56) References Cited

U.S. PATENT DOCUMENTS 6,546,375 B1 * 4/2003 Pang et al. ..................... 705/37

(Continued)

FOREIGN PATENT DOCUMENTS

JP 2002-92321 9/2000

(Continued)

OTHER PUBLICATIONS

Downes, J. et al, Dictionary of Finance and Investment Terms, Fifth Edition, 1998, p. 138.*

(Continued)

*Primary Examiner*—Hani Kazimi
*Assistant Examiner*—Daniel Kesack
(74) *Attorney, Agent, or Firm*—Reed Smith LLP; Stanley P. Fisher, Esq.; Juan Carlos A. Marquez, Esq.

(57) ABSTRACT

A rating method for securities or fixed rate financing instruments includes calculating a rating value for each one of the securities or fixed rate financing instruments based upon a formula involving grading numbers and weighting factors corresponding to risk and return attributes. The return attribute may be an interest rate, a dividend yield, a yield to maturity, a project performance rating of an issuer, or a ratio defined with a price per share of securities. A method for evaluating a price of a security or fixed rate financing instrument includes calculating an evaluated price based upon a formula involving grading numbers and weighting factors corresponding to each of real-time data including a face value, a coupon, a period prior to maturity, a credit rating of an issuer, a yield, and a yield to maturity; and comparing the evaluated price with a real-time price.

2 Claims, 32 Drawing Sheets

U.S. PATENT DOCUMENTS

| | | | |
|---|---|---|---|
| 6,839,686 B1 * | 1/2005 | Galant | 705/36 R |
| 2001/0039526 A1 | 11/2001 | Pittenger | |
| 2002/0099640 A1 * | 7/2002 | Lange | 705/37 |
| 2002/0116310 A1 * | 8/2002 | Cohen et al. | 705/36 |
| 2002/0133447 A1 * | 9/2002 | Mastman | 705/36 |
| 2002/0156709 A1 * | 10/2002 | Andrus et al. | 705/35 |
| 2003/0004846 A1 * | 1/2003 | Schneider | 705/36 |
| 2003/0009409 A1 * | 1/2003 | Horner et al. | 705/36 |
| 2003/0028462 A1 | 2/2003 | Fuhrman et al. | |
| 2003/0093352 A1 * | 5/2003 | Muralidhar et al. | 705/36 |
| 2003/0208431 A1 | 11/2003 | Raynes et al. | |
| 2004/0024677 A1 * | 2/2004 | Wallman | 705/36 |
| 2004/0103050 A1 | 5/2004 | Long | |
| 2005/0246255 A1 * | 11/2005 | Rousseau et al. | 705/35 |

FOREIGN PATENT DOCUMENTS

| | | |
|---|---|---|
| JP | 2002-133093 | 10/2000 |
| JP | 2002-140504 | 10/2000 |
| JP | 2002-169958 | 12/2000 |
| JP | 200405626 | 3/2003 |
| WO | WO 03/079232 A2 | 3/2003 |

OTHER PUBLICATIONS

Nortel News Release, Sep. 28, 2001, 2 pages.*

Harrell, D., The morningstar Universe, Dec. 28, 1999, 4 pages.*

Altman, E.I. et al, Credit Risk Management: Develpoments over the Last 20 Years, Jnl. Finan. and Banking, 1997, 22 pages.*

"Smith Barney's Stock Rating System", Smith Barney Citigroup, http://www.smithbarney.com/research.rating_system.html, 4 pages.

Jon Markman, article entitled "StockScouter Rates Potential Reward, and Risk", MSN Money, (2005), http://moneycentral.msn.com/content/investing/findhotstocks/p38814.asp, 7 pages.

"Rating Definitions", Moody's In Europe, Inside Moody's Ratng Definitions, http://www.moddyseurope.com/mdcsPage.aspex?template=ratingdefinitions&mdcsld=1, 4 pages.

"Moody's Credit Risk Calculator", Moody's Investors Service, 4 pages.

Christopher Mahoney, "The Bond Rating Process: A Progress Report", Moody's Investors Service, Global Credit Research, Feb. 2002, 4 pages.

Christopher Mahoney, "The Bond Rating Process in a Changing Environment", Moody's Investors Service, Global Credit Research, Jan. 2002, 4 pages.

Richard Cantor et al., "Rating Methodology—the Evolving Meaning of Moody's Bond Ratings", Moody's Investors Service, Global Credit Research, Aug. 1999, 8 pages.

"Guide to Moody's Ratings, Rating Process, and Rating Practices", Moody's Investors Service, Jun. 2004, 48 pages.

* cited by examiner

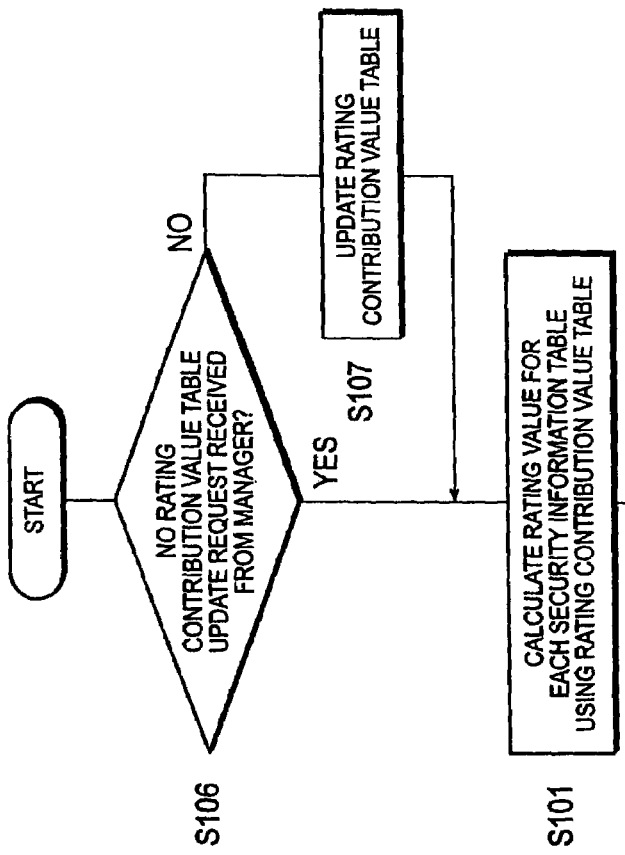

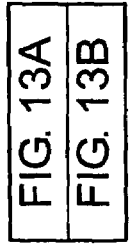
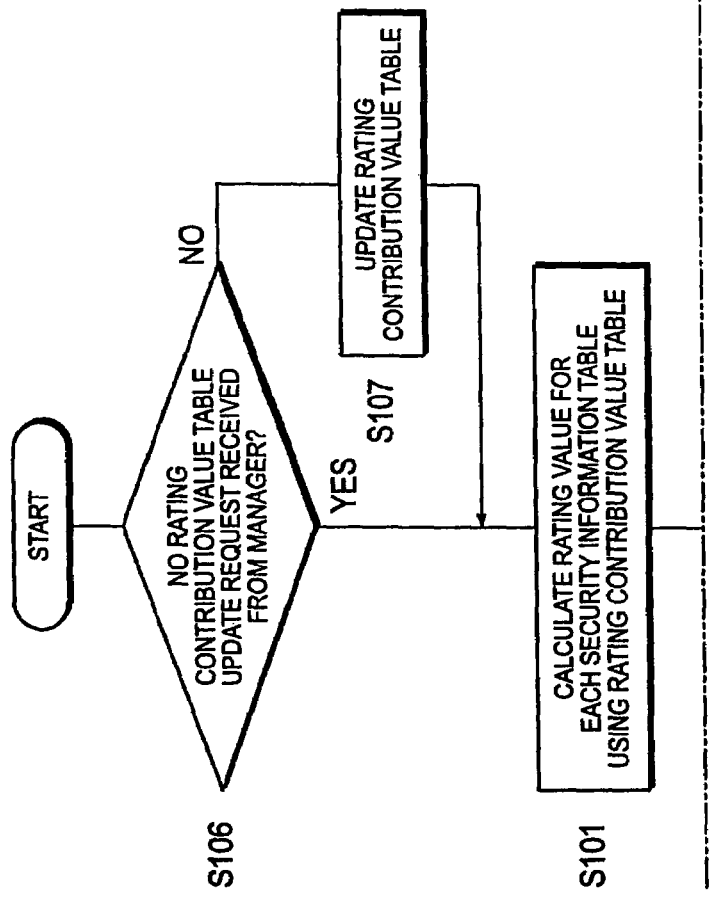
FIG. 13A

FIG. 14

RATING CONTRIBUTION VALUE TABLE
WITH REFERENCE TO SECURITY TITLES

| TITLE OF SECURITY | RATING CONTRIBUTION VALUE |
|---|---|
| ODAIBA CASINO BOND | 90 |
| NUMAZU MUNICIPAL HOSPITAL BOND | 50 |
| SAITAMA STATION FRONT BUILDING BOND | 40 |
| JAPAN HIGHWAY BOND | 40 |
| STOMACH CANCER SUPPRESSANT DEVELOPMENT PROJECT BOND | 80 |
| XX SATELLITE PROJECT BOND | 50 |
| YY OIL FIELD PROJECT BOND | 70 |
| ZZ NATURAL GAS PROJECT BOND | 70 |

FIG. 15

RATING CONTRIBUTION VALUE TABLE
WITH REFERENCE TO FACE VALUES

| FACE VALUE | RATING CONTRIBUTION VALUE |
|---|---|
| ¥1,000,000 | 70 |
| ¥500,000 | 80 |
| ¥100,000 | 90 |
| ¥50,000 | 80 |
| ¥10,000 | 70 |

FIG. 16

RATING CONTRIBUTION VALUE TABLE
WITH REFERENCE TO CONTENTS OF PUBLIC WORKS

| CONTENTS OF THE PUBLIC WORKS | RATING CONTRIBUTION VALUE |
|---|---|
| TO CONSTRUCT AND OPERATE A CASINO IN ODAIBA | 90 |
| TO CONSTRUCT AND OPERATE A MUNICIPAL HOSPITAL IN NUMAZU CITY | 50 |
| TO CONSTRUCT AND OPERATE A BUILDING IN FRONT OF SAITAMA STATION | 40 |
| TO OPERATE TOMEI HIGHWAY | 40 |
| TO DEVELOP A STOMACH CANCER SUPPRESSANT | 80 |
| TO LAUNCH AND OPERATE XX SATELLITE | 50 |
| TO DEVELOP AND MANAGE YY OIL FIELD | 70 |
| TO DEVELOP AND MANAGE ZZ NATURAL GAS | 70 |

FIG. 17

RATING CONTRIBUTION VALUE TABLE WITH REFERENCE TO PLANNERS

| PLANNER | RATING CONTRIBUTION VALUE |
|---|---|
| GOVERNMENT OF JAPAN | 90 |
| GOVERNMENT OF THE REPUBLIC OF KOREA | 50 |
| GOVERNMENT OF THE PEOPLE'S REPUBLIC OF CHINA | 20 |
| GOVERNMENT OF THE U.S.A. | 80 |
| GOVERNMENT OF CANADA | 60 |
| GOVERNMENT OF RUSSIA | 20 |
| METROPOLITAN GOVERNMENT OF TOKYO | 70 |
| CITY OF NUMAZU | 10 |
| CITY OF SAITAMA | 20 |

| PLANNER | RATING CONTRIBUTION VALUE |
|---|---|
| A CASINO OPERATING COMPANY IN LAS VEGAS | 40 |
| JAPAN HIGHWAY PUBLIC CORPORATION | 50 |
| TAKEDA CHEMICAL INDUSTRIES, LTD. | 80 |
| NATIONAL SPACE DEVELOPMENT AGENCY OF JAPAN | 40 |
| MITSUBISHI HEAVY INDUSTRIES, LTD. | 65 |
| UFJ BANK | 60 |
| GULF OIL CO. | 70 |
| OCCIDENTAL OIL CO. | 70 |
| (NO) | 0 |

FIG. 18

RATING CONTRIBUTION VALUE TABLE WITH REFERENCE TO EXECUTORS

| EXECUTOR | RATING CONTRIBUTION VALUE |
|---|---|
| GOVERNMENT OF JAPAN | 90 |
| GOVERNMENT OF THE REPUBLIC OF KOREA | 50 |
| GOVERNMENT OF THE PEOPLE'S REPUBLIC OF CHINA | 20 |
| GOVERNMENT OF THE U.S.A. | 80 |
| GOVERNMENT OF CANADA | 60 |
| GOVERNMENT OF RUSSIA | 20 |
| METROPOLITAN GOVERNMENT OF TOKYO | 70 |
| CITY OF NUMAZU | 10 |
| CITY OF SAITAMA | 20 |
| A CASINO OPERATING COMPANY IN LAS VEGAS | 40 |
| JAPAN HIGHWAY PUBLIC CORPORATION | 50 |
| TAKEDA CHEMICAL INDUSTRIES, LTD. | 80 |
| NATIONAL SPACE DEVELOPMENT AGENCY OF JAPAN | 40 |
| MITSUBISHI HEAVY INDUSTRIES, LTD. | 65 |
| UFJ BANK | 60 |
| GULF OIL CO. | 70 |
| OCCIDENTAL OIL CO. | 70 |
| (NO) | 0 |

FIG. 19

RATING CONTRIBUTION VALUE TABLE WITH REFERENCE TO GUARANTORS

| GUARANTOR | RATING CONTRIBUTION VALUE |
|---|---|
| GOVERNMENT OF JAPAN | 90 |
| GOVERNMENT OF THE REPUBLIC OF KOREA | 50 |
| GOVERNMENT OF THE PEOPLE'S REPUBLIC OF CHINA | 20 |
| GOVERNMENT OF THE U.S.A. | 80 |
| GOVERNMENT OF CANADA | 60 |
| GOVERNMENT OF RUSSIA | 20 |
| METOROPOLITAN GOVERNMENT OF TOKYO | 70 |
| CITY OF NUMAZU | 10 |
| CITY OF SAITAMA | 20 |

| GUARANTOR | RATING CONTRIBUTION VALUE |
|---|---|
| A CASINO OPERATING COMPANY IN LAS VEGAS | 40 |
| JAPAN HIGHWAY PUBLIC CORPORATION | 50 |
| TAKEDA CHEMICAL INDUSTRIES, LTD. | 80 |
| NATIONAL SPACE DEVELOPMENT AGENCY OF JAPAN | 40 |
| MITSUBISHI HEAVY INDUSTRIES, LTD. | 65 |
| UFJ BANK | 60 |
| GULF OIL CO. | 70 |
| OCCIDENTAL OIL CO. | 70 |
| (NO) | 0 |

FIG. 20

RATING CONTRIBUTION VALUE TABLE WITH
REFERENCE TO REDEMPTION PERIODS

| REDEMPTION PERIOD | RATING CONTRIBUTION VALUE |
|---|---|
| 5 YEARS | 80 |
| 6 YEARS | 70 |
| 7 YEARS | 60 |
| 8 YEARS | 50 |
| 9 YEARS | 40 |
| 10 YEARS | 30 |
| (NO) | 20 |

FIG. 21

RATING CONTRIBUTION VALUE TABLE WITH
REFERENCE TO INTEREST RATES

| INTEREST RATE | RATING CONTRIBUTION VALUE |
|---|---|
| 5.0% | 100 |
| 4.5% | 90 |
| 4.0% | 80 |
| 3.5% | 70 |
| 3.0% | 60 |
| 2.5% | 50 |
| 2.0% | 40 |
| 1.5% | 30 |
| 1.0% | 20 |

FIG. 22

RATING CONTRIBUTION VALUE TABLE WITH
REFERENCE TO GUARANTEED LIMITS

| GUARANTEED LIMIT | RATING CONTRIBUTION VALUE |
|---|---|
| 95% | 50 |
| 90% | 40 |
| 80% | 30 |
| 70% | 20 |
| 60% | 10 |
| 50% | 5 |

FIG. 23

RATING CONTRIBUTION VALUE TABLE WITH
REFERENCE TO DIVIDENDS

| DIVIDEND | RATING CONTRIBUTION VALUE |
|---|---|
| YES | 100 |
| NO | 0 |

FIG. 24

RATING CONTRIBUTION VALUE TABLE WITH
REFERENCE TO NUMBER OF ISSUED SHEETS

| NUMBER OF ISSUED SHEETS | RATING CONTRIBUTION VALUE |
|---|---|
| 10000~ | 100 |
| 5000~9999 | 80 |
| 1000~4999 | 60 |
| 500~999 | 40 |
| 1~499 | 20 |

FIG. 25

RATING CONTRIBUTION VALUE TABLE WITH
REFERENCE TO NUMBER OF TRANSMISSIONS

| NUMBER OF TRANSMISSIONS | RATING CONTRIBUTION VALUE |
|---|---|
| 200000~ | 100 |
| 100000~199999 | 80 |
| 50000~99999 | 60 |
| 10000~49999 | 40 |
| 5000~9999 | 20 |
| 1~4999 | 10 |

FIG. 26

LIST OF SECURITIES

TO VIEW THE DETAILS OF A SECURITY, CLICK THE FACE VALUE OF THE SECURITY.
TO COMPARE ALL THE SECURITIES, CLICK THE "COMPARISON OF ALL SECURITIES."

| ODAIBA CASINO BOND | | | |
|---|---|---|---|
| ¥1,000,000 | ¥500,000 | ¥100,000 | ¥50,000 | ¥10,000 |

| STOMACH CANCER SUPPRESSANT DEVELOPMENT PROJECT BOND | | | |
|---|---|---|---|
| ¥1,000,000 | ¥500,000 | ¥100,000 | ¥50,000 | ¥10,000 |

| NUMAZU MUNICIPAL HOSPITAL BOND | | | |
|---|---|---|---|
| ¥1,000,000 | ¥500,000 | ¥100,000 | ¥50,000 | ¥10,000 |

| XX SATELLITE PROJECT BOND | | | |
|---|---|---|---|
| ¥1,000,000 | ¥500,000 | ¥100,000 | ¥50,000 | ¥10,000 |

| SAITAMA STATION FRONT BUILDING BOND | | | |
|---|---|---|---|
| ¥1,000,000 | ¥500,000 | ¥100,000 | ¥50,000 | ¥10,000 |

| YY OIL FIELD PROJECT BOND | | | |
|---|---|---|---|
| ¥1,000,000 | ¥500,000 | ¥100,000 | ¥50,000 | ¥10,000 |

| JAPAN HIGHWAY BOND | | | |
|---|---|---|---|
| ¥1,000,000 | ¥500,000 | ¥100,000 | ¥50,000 | ¥10,000 |

| ZZ NATURAL GAS PROJECT BOND | | | |
|---|---|---|---|
| ¥1,000,000 | ¥500,000 | ¥100,000 | ¥50,000 | ¥10,000 |

COMPARISON OF ALL SECURITIES

Fig. 32

| Securities Identification | 20040404 | | | | | 20030201 | | | | | 20001025 | | | | |
|---|---|---|---|---|---|---|---|---|---|---|---|---|---|---|---|
| Name of Public Work | ODAIBA CASINO | | | | | NUMAZU MUNICIPAL HOSPITAL | | | | | SAITAMA STATION FRONT BUILDING | | | | |
| Face Value (Million yen) | 100 | 50 | 10 | 5 | 1 | 100 | 50 | 10 | 5 | 1 | 100 | 50 | 10 | 5 | 1 |
| Contents of Public Work | Construction of casino in Odaiba and its operation | | | | | Construction of municipal hospital in Numazu and its operation | | | | | Construction of building in front of Saitama station and its operation | | | | |
| Planner | Japan Gov | | | | | South Korea Gov | | | | | China Gov | | | | |
| Executor | The Metropolis of Tokyo and some management company in Las Vegas | | | | | Numazu City | | | | | Saitama City | | | | |
| Guarantor | United States Gov | | | | | Japan Gov | | | | | China Gov | | | | |
| Redemption Period | 10 years | | | | | 5 years | | | | | 8 years | | | | |
| Interest Rate (Annual) | 3% | | | | | 2% | | | | | 2.5% | | | | |
| Guaranteed Limit | 70% | | | | | 80% | | | | | 80% | | | | |
| Dividend | None | | | | | None | | | | | None | | | | |
| Comment of Related Parties | Comment from the Governor of Tokyo | | | | | Comment from the Mayor of Numazu | | | | | Comment from the Mayor of Saitama | | | | |

Fig. 33

| Securities Identification | 20020401 | | | | | 20020938 | | | | | 20060825 | | | | |
|---|---|---|---|---|---|---|---|---|---|---|---|---|---|---|---|
| Name of Public Work | JAPANESE HIGHWAY | | | | | STOMACH CANCER SUPPRESSANT DEVELOPMENT PROJECT | | | | | XX SATELLITE PROJECT | | | | |
| Face Value (Million yen) | 100 | 50 | 10 | 5 | 1 | 100 | 50 | 10 | 5 | 1 | 100 | 50 | 10 | 5 | 1 |
| Contents of Public Work | Operation of Tomei Highway | | | | | Development of stomach cancer suppressant | | | | | Launching and operation of XX satellite | | | | |
| Planner | | | | | | Japan | | | | | Japan / National Space Development Agency | | | | |
| Executor | Japan Highway Public Corporation | | | | | Takeda Chemical Industries, Ltd. | | | | | National Space Development Agency | | | | |
| Guarantor | Japan Gov | | | | | Japan / UFJ Bank | | | | | Japan / Mitsubishi Heavy Industries, Ltd. | | | | |
| Redemption Period | None | | | | | 10 years | | | | | 6 years | | | | |
| Interest Rate (Annual) | 3% | | | | | 2.5% | | | | | 2% | | | | |
| Guaranteed Limit | 60% | | | | | 50% | | | | | 85% | | | | |
| Dividend | Yes | | | | | None | | | | | None | | | | |
| Comment of Related Parties | Comment from the Prime Minister of Japan | | | | | Comment from the President of Takeda Chemical Industries, Ltd. | | | | | Comment from National Space Development Agency and Director of the Science and Technology Agency | | | | |

Fig. 34

| Securities Identification | 20100962 | | | | | 20904829 | | | | |
|---|---|---|---|---|---|---|---|---|---|---|
| Name of Public Work | YY Oil Field Project | | | | | ZZ Natural Gas Project | | | | |
| Face Value (Million yen) | 100 | 50 | 10 | 5 | 1 | 100 | 50 | 10 | 5 | 1 |
| Contents of Public Work | Development and Management of YY Oil Field | | | | | Development and Management of ZZ Natural Gas | | | | |
| Planner | Japan / Russia / Gulf Oil Co. | | | | | Japan / Canada / Occidental Oil Co. | | | | |
| Executor | Gulf Oil Co. | | | | | Occidental Oil Co. | | | | |
| Guarantor | Japan / Russia Govs | | | | | Japan / Canada Govs | | | | |
| Redemption Period | 10 years | | | | | 9 years | | | | |
| Interest Rate (Annual) | 5% | | | | | 2.5% | | | | |
| Guaranteed Limit | 70% | | | | | 65% | | | | |
| Dividend | None | | | | | None | | | | |
| Comment of Related Parties | Comment from the President of Russia | | | | | Comment from the President of Canada | | | | |

Fig. 35

| Ratings | | | | |
|---|---|---|---|---|
| Moody's | S&P | Fitch | DCR | Definitions |
| Aaa | AAA | AAA | AAA | Prime. Maximum Safety |
| Aa1 | AA+ | AA+ | AA+ | High Grade. High Quality |
| Aa2 | AA | AA | AA | |
| Aa3 | AA- | AA- | AA- | |
| A1 | A+ | A+ | A+ | Upper Medium Grade |
| A2 | A | A | A | |
| A3 | A- | A- | A- | |
| Baa1 | BBB+ | BBB+ | BBB+ | Lower Medium Grade |
| Baa2 | BBB | BBB | BBB | |
| Baa3 | BBB- | BBB- | BBB- | |
| Ba1 | BB+ | BB+ | BB+ | Non Investment Grade |
| Ba2 | BB | BB | BB | Speculative |
| Ba3 | BB- | BB- | BB- | |
| B1 | B+ | B+ | B+ | Highly Speculative |
| B2 | B | B | B | |
| B3 | B- | B- | B- | |
| Caa | CCC+ | CCC | CCC | Substantial Risk. |
| | CCC | | | In Poor Standing |
| | CCC- | | | |
| Ca | | | | Extremely Speculative |
| C | | | | May be in Default |
| | | DDD | | Default |
| | | DD | DD | |
| | D | D | | |
| | | | DP | |

STREET SOFTWARE BOND PRICING
Over One Million Bonds Priced Daily

Price-Yield Calculator...

Home

Services

Online pricing

Schedule

Partners

Contact

Enter dates mm/dd/yyyy

Bond Type [Agency]

Settle Date [03] / [29] / [2005]

Maturity Date [04] / [01] / [2008]

Coupon [5.000]

Price [100.000]

Yield [5.000]

Issue (opt) [__] / [__] / [____]

FirstCpn (opt) [__] / [__] / [____]

Calc Type [To Price]

[Calculate]

Settle: 03/29/2005    Type: AGCY
Maturity: 04/01/2008  Coupon: 5.000
Price: 99:32          Yield: 5.000
Acc Int: 2.47         Wkend Yld: 5.0
Int+Prin: 102.47      Mod Dur: 2.69
PrcVal: 0.03          YldVal of 32: 1
Next Cpn: 04/01/2005  Cpns Remain:

Range Report:

| Price | Yield |
|---|---|
| Price: 99:28 | Yield: 5.045 |
| Price: 99:29 | Yield: 5.034 |
| Price: 99:30 | Yield: 5.023 |
| Price: 99:31 | Yield: 5.011 |
| Price: 99:32 | Yield: 5.000 |
| Price: 100:01 | Yield: 4.989 |
| Price: 100:02 | Yield: 4.977 |
| Price: 100:03 | Yield: 4.966 |
| Price: 100:04 | Yield: 4.955 |

[Printable Version]

Copyright © 2005 Street Software Technology, Inc.   Disclaimer

FIG 36

*Prior Art*

Prior Art

METHOD AND SYSTEM FOR RATING SECURITIES, METHOD AND SYSTEM FOR EVALUATING PRICE OF SECURITIES, METHOD FOR ESTABLISHING A MARKET WITH THE SYSTEM

CROSS-REFERENCE TO RELATED APPLICATION

This application is a Continuation-in-Part application of U.S. application Nos. 10/233,995 filed on Aug. 30, 2002 now abandoned, 10/358,432 filed on Feb. 4, 2003 now abandoned, 10/376,358 filed on Feb. 27, 2003 now abandoned and 10/444,870 filed on May 23, 2003 now abandoned, Priority is claimed based on the parent U.S. application Nos. 10/233,995 filed on Aug. 30, 2002, 10/358,432 filed on Feb. 4, 2003 and 10/376,358 filed on Feb. 27, 2003 and 10/444,870 filed on May 23, 2003, which claim the priority dates of Sep. 3, 2001, Feb. 5, 2002, Feb. 27, 2002, Mar. 11, 2002, May 31, 2002, Sep. 3, 2002 and Feb. 4, 2003, the filing dates of Japanese Patent Application Nos. 2001-265178, 2002-27550, 2002-51085, 2002- 65123, 2002-158595, 2002-257497 and 2003-27127, respectively.

BACKGROUND OF THE INVENTION

FIELD OF THE INVENTION

The present invention relates to systems, servers, methods, programs and computer-readable recording media that handle rating of securities and fixed rate financing instruments, and a method for establishing a market with the system. In addition, the present invention relates to systems, servers, methods, programs and computer-readable recording media for evaluating price of securities which automatically translates offers and orders quotes into current yields, YTM, as well as custom-calibrated-value prices to assist each investor to make the person's own investment decision, rather than relying upon any analyst's or the investor's brain or intuition to put all the factors of face value, coupon, maturity, the issuer, yield, and price (based on variables including interest rates, supply and demand, credit quality, maturity, and tax status) into consideration.

DESCRIPTION OF THE PRIOR ART

Investors who invested in bonds become unable to receive redemptions of principals and payments of interests when the bond issuers' operating conditions deteriorate.

Investors who are considering investments in bonds must therefore make various judgments prior to investments on certainties of redemptions of principals and payments of interests of the bonds (hereinafter called "safety of bond").

While there are various grounds for judging the safety of a bond including information provided by the bond issuer and the credibility of the bond issuer in the society, one of the most credible information trusted by investors in judging the safety of a bond is the "bond rating" using simply codes such as AAA ("triple A"), AA ("double A") and A ("single A") to denote the safety of bonds.

The bond rating process has hitherto been provided by an institution that is believed to hold a fair and impartial position.

However, although it attempts to hold a fair and impartial position, such a rating institution performs the rating process solely dependent on its own evaluation of the bond. Therefore, there has been no guaranty on whether the rating of a bond is done objectively in relation to the rating of another bond.

Under the circumstances, it is an intention of the present invention to provide a security rating system, a security rating method, a security rating server, a security rating server control method, a security rating server control program, a computer-readable recording medium storing the security rating server control program, a security rating client, a security rating client control method, a security rating client control program, a computer-readable recording medium recording the security rating client control program, a managing client, a managing client control method, a managing client control program, and a computer-readable recording medium recording the managing client control program that perform rating of bonds by providing an equal "rating contribution value" to all bonds that share a common bond element, for example, a common "guarantor," e.g., "the Government of Japan."

New York Stock Exchange (NYSE) requires bids and offers of all bonds traded in the Automated Bond System (ABS) to be recorded and matched on a price and time priority basis. Because bids and ask prices of these inactively traded bonds are not constantly changing due to demand and supply conditions, investors have difficulties to look for a quote. By electronically monitoring all inactive bonds, the NYSE keeps an inventory of bond prices for investors to check.

MSN Money Stock Search supports searching stocks by Industry (accident & health insurance, advertising agencies, aerospace/defense, chemicals, air delivery & freight services, etc.), by Dow Jones index membership (DJ Utilities, DJ Transports, DJ Industrials), by market cap (any, small cap, mid cap, large cap), by S&P index membership, by dividend yield, by average daily volume over last 2 weeks, by 12-month relative strength, by revenue growth year vs. year, by price/earnings ratio, by net profit margin, and by debt/equity ratio, etc. Yahoo's Stock Screener further supports search stocks by 1 yr performance (up more than 200%, up more than 100%, . . . . down more than 10%, down more than 25%, etc), by beta/volatility (any, 0.5, 1.0, 1.5, 2.0, 3.0, 4.0), by sales revenue, by profit margin, by price/book ratio, by price/sales ratio, by peg (price/earnings to growth) ratio, by est. 1 yr EPS (earnings per share) growth, by Est. 5 Yr EPS Growth, by Avg Analyst Rec: (1=Buy, 5=Sell).

Bond market information is made available by the Bond Market Association with data form MSRB and Standard & Poor's ("S&P"). It divides bonds into a Municipal Market, a Government Market, a Corporate Market, and a mortgage-backed (MBS) and asset-backed (ABS) Market. It allows searches municipal bonds by maturity term, by state, by type (general obligation, revenue, trust, insured, etc), by purpose (education, power, hospital, transportation, etc.), by coupon (annual interest rate), by CUSIP (unique nine-digit numbers assigned to each series of securities), by trade time, by yield, by price. It allows searches corporate bonds by issuer, by CUSIP, and by sector (financial, industrial, utilities). Yahoo's Bond Screener further supports search bonds by YTM range (%), by debt rating range, by callable. In the US, bonds are not traded on an formal exchange, are thus considered over-the-counter securities. Most debt instruments are traded by investment banks. If someone wants to buy or sell a bond, they call the bank that makes the market for a particular bond and asks for quotes. The brokers/dealers negotiate directly with one another over computer networks and by phone. Bonds tend to trade infrequently, making the bid-ask spread larger. Currently, there are formal exchanges providing or maintaining a marketplace for stocks, options, futures, commodities, or currencies, but not for bonds or the fixed rate financing instruments of the invention. There is need for formal exchanges for bonds or the fixed rate financing instruments so make the bond transaction prices and qualities transparent.

Stock rating is an evaluation of a stock's expected performance and/or its risk level as judged by a rating agency such as Standard and Poor's. A stock rating will usually tell the investor how well a stock's market value relates to what analysts believe is a fair value for the stock, based on an objective evaluation of the company. The greater the amount by which the fair value exceeds the market value, the more highly recommended a buy the stock is. Conversely, if the market value of the stock exceeds the fair value of the stock, then analysts recommend that the stock be sold. Most stock rating systems give stocks one to five stars, with five being best.

There are many risk ratings and investment ratings for stocks. Smith Barney's stock recommendations include a risk rating and an investment rating. Risk ratings, which take into account both price volatility and fundamental criteria, are: Low (L), Medium (M), High (H), and Speculative (S). Investment ratings—Buy (1), Hold (2), and Sell (3)—are based upon Smith Barney's expectation of total return (price appreciation plus forecast dividend yield) within the next 12 months, and take into account the risk rating.

MSN Money provides a StockScouter rating system to help individual investors quickly analyze and assess a stock's potential for outperforming the broad market. StockScouter depends on advanced mathematics, software, a mix of measurements and historical testing to forecast the short- and long-term outlook for U.S. 5,500 stocks. In rating the outlook for stocks from strong to poor on a 10-point scale, StockScouter does not make subjective judgments. Instead, it compares the fundamental and technical qualities of individual companies and their stocks to benchmarks that have proven statistically predictive of stock performance in the past. It then assigns an expected six-month return to each stock based on this statistical profile, and balances that return against expected volatility. This ratio of expected return to expected volatility, or "risk," yields a stock's final overall rating.

While some investors use a particular analysts' stock ratings as guidance, it is important to evaluate the criteria which the analysts use to determine fair value, since the techniques they use are diverse and not all analysts are equally competent. Although "buy", "sell" and "hold" ratings effectively convey the bottom line to investors, companies' earnings forecast is speculative, and different analysts may arrive at different conclusions. These rating recommendations fails to segregate stock's investment risk and the analysis's personal risk tolerance. Worst of all, the stock ratings are susceptible to manipulation as sales tools.

However, for bonds and other fixed rate financing instruments, only credit ratings are available. Before investors decide whether to invest in a debt security issued by a company or foreign country, they determine whether the issuers will be able to meet its obligations. Ratings companies provide independent objective assessments of the credit worthiness of companies and countries. Credit ratings are published by Moody's, Standard and Poor's, Fitch IBCA, and DCR as shown in FIG. 20. It is based upon the history of borrowing and repayment, as well as the availability of assets and extent of liabilities. An entity with low credit rating will most likely have to pay high yield due to the risk of default.

A bond rating on investment grade debt usually ranges from AAA to BBB. Investment grade bonds might not offer huge returns, but the risk of the borrower defaulting on interest payments is much smaller. It is therefore important that investors know how to assess credit risk and its potential pay offs. While rising interest rate reduces the value of bond, a default eliminates the value (holders of defaulted bonds can recover some of their principal, i.e., at pennies on a dollar).

Corporate bonds offer a high yield compared to some other bonds, but the higher yield comes with risk. Most corporate bonds are debentures which are not secured by collateral. Investors of such bonds must assume not only interest rate risk but also credit risk, i.e., the chance that the corporate issuer will default on its debt obligations.

As an example, Moody's ratings are opinions of future relative creditworthiness, derived by fundamental credit analysis which includes evaluating franchise value, analyze financial statement and management quality. Many tools are used to analyze and assess credit risk, including two traditional metrics include interest coverage ratios and capitalization ratios. Moody's Credit Risk Calculator provides an interface for user to adjusting issuing entities and time period so as to generate customized credit report with based upon Moody's reports. Moody's analysts and institutional bond investors often supplement these agency credit ratings and reports with confidential non-public information and their own credit analysis.

JP Pub. No. 2002-92321 describes a credit rating method which measures a company's ability to meet its debt obligations by calculating a plurality of first financial indices indicating a financial condition of the company in multiple aspects based on inputted numerical values on a balance sheet and profit-and-loss statement, calculating a plurality of second financial indices indicating a substantial financial condition of the company in multiple aspects based on the numerical values on the balance sheet and profit-and-loss statement and inputted first additional information partially representing substantial numerical values on the balance sheet and profit-and-loss statement, calculating a plurality of third financial indices indicating a deviance from actual finances of the balance sheet and profit-and-loss statement based on the numerical values on the balance sheet and profit-and-loss statement, and the first financial indices and the second financial indices, rating the first to third financial indices by score in accordance with a preset first rating reference that has been weighted and summing up scores thereof; and determining a credit category to which the credit of the company belongs, from among a plurality of divided credit categories that have been preset, based on the sum of scores. The financial indices include a return on asset, an ordinary income/net sales ratio, a turnover of total capital, a current ratio, a fixed assets/liability ratio, a capital ratio, an ordinary balance ratio, a transition in net sales, a transition in current-term profit, and total own capital, thereby evaluating and rating the company from various aspects such as profitability, efficiency, stability, a financial growth potential, and a company's scale. However, the indices do not include any price per share of securities or any return attribute of the securities such as an interest rate, a dividend yield, a yield to maturity, a project performance rating of an issuer, a price/earnings ratio, a periodical price performance percentage, a beta/volatility radio, a price/book ratio, a price/sales ratio, a Price/Earnings to Growth Ratio, or an estimated periodical Earnings per Share Growth.

JP Pub. No. 2002-140504 describes a display method for a rating appraisal and rating device. It extracts financial data on the company to calculate financial indices indicating a scale, profitability, and financial health of a company. The financial indices indicating the scale of the company include a total capital and shareholder's equity. The financial indices indicating the profitability include a ROE (rate of return on equity), a ROA (return on asset), an ordinary income/net sales ratio, an ROIC (Return On Investment Capital), and an EBITDA (Earnings Before Interest, Taxes, Depreciation, and Amortization) margin. The financial indices indicating the financial health include a capital ratio, a fixed ratio, a fixed assets/liability ratio, a current ratio, and a quick assets ratio indicative of a static financial health. However, the indices do not include any price per share of securities or any return attribute of the securities such as an interest rate, a dividend yield, a yield to maturity, a project performance rating of an issuer, a price/earnings ratio, a periodical price performance percentage, a beta/volatility radio, a price/book ratio, a price/sales ratio, a Price/Earnings to Growth Ratio, or an estimated periodical Earnings per Share Growth.

JP Pub. No. 2002-169958 describes a credit evaluation system of borrowers in different industrial sectors, of different business sizes, etc. on a uniform basis. It involves explanatory variables and coefficients thereof such as a ROA, a ratio of total liabilities, etc., as well as compensation variables such as a default acquisition rate, a survival acquisition rate, etc. However, it does not involve any price per share of securities or any return attribute of the securities such as an interest rate, a dividend yield, a yield to maturity, a project performance rating of an issuer, a price/earnings ratio, a periodical price performance percentage, a beta/volatility radio, a price/book ratio, a price/sales ratio, a Price/Earnings to Growth Ratio, or an estimated periodical Earnings per Share Growth.

JP Pub. No. 2002-133093 describes a production facility rating service system for valuating assets by considering influence exerted on the wear and tear of a facility depending on the quality of maintenance, the deflection or deviation of a practical use condition with respect to a design use condition, thereby securitizing business in which a production facility such as a chemical plant is converted into a security for sale to an investor. The evaluation involves acquisition prices of all the devices, equipment, etc in the facilities, but not any price per share of securities or any return attribute of the securities such as an interest rate, a dividend yield, a yield to maturity, a project performance rating of an issuer, a price/earnings ratio, a periodical price performance percentage, a beta/volatility radio, a price/book ratio, a price/sales ratio, a Price/Earnings to Growth Ratio, or an estimated periodical Earnings per Share Growth.

US Patent Application Publication No. 20030208431 provides a structured finance performance monitoring index and a method for assessing and dynamically rating transactions for structured finance transactions. The method assesses the deviation from a payment promise to be expected from securities backed by pools of assets of various forms 100, the securities being issued in a plurality of tranches. The liabilities of the transaction, including triggers and external form of credit enhancement, are taken into account to compute the deviation from the payment promise to be expected by liability holders. Data representing the structure of the transaction and the current state of the asset pool are received. A Markov chain formalism is applied on the received data, and a cash flow model is constructed to predict the cash flow performance of the asset pool. The evaluation does not involve any price per share of securities or any return attribute of the securities such as an interest rate, a dividend yield, a yield to maturity, a project performance rating of an issuer, a price/earnings ratio, a periodical price performance percentage, a beta/volatility radio, a price/book ratio, a price/sales ratio, a Price/Earnings to Growth Ratio, or an estimated periodical Earnings per Share Growth.

As all the existing bond ratings only focus on credit risk, i.e., the issuers' ability to pay back, there is a need for comprehensive bond ratings which evaluate both risks (along with other negative factors) and returns (along with other positive factors) of owning a bond or other financing instruments. There is a need for more transparent quantitative security ratings which evaluate both risks and returns.

When bond price goes up, bond yield goes down and vice versa. The simplest yield is calculated by: current yield=coupon amount/current price. When a bond is bought at par, yield is equal to the interest rate. Bonds are usually quoted as a yield to maturity (YTM), rather than the current yield. YTM is the total return to receive if hold the bond to maturity. It equals all the interest payments to receive (assuming reinvesting the interest payment at the same rate as the current yield on the bond) plus any gain or loss (if purchased at a discount or premium). Technically, the bond's prices and its yield are inversely related. YTM, however, is an interest rate that must be calculated through trial and error, which is complicated and time consuming. Investors typically use price-yield calculator program to run through the process of trial and error to list results as in FIG. 36.

All interest rates move up and down. The yield curve is used to capture the overall movement of interest rates. By examining the yield curve on any particular day, investors have a snapshot of the different yields for various maturities. By checking the yield curve, investors gather information to make investment decisions. If yields for the various maturities are plotted on a graph, the normal yield curve is upward sloping as shown in FIG. 37A. The yield curve in FIG. 37A shows interest rates at a specific point for all securities having equal risk, but different maturity dates. For bonds, it typically compares the 2 or 5 year treasury with the 30 year. This means that generally the yields are higher for longer maturities as compared to short-term maturities. The longer the money is tired up, the more reward for the extra risk taken, as long-term bonds generally have more risk than short-term bonds. A yield curve could be drawn for any bond market, but it is most commonly drawn for the U.S. Treasury market, which offers bonds of every maturity, and where all issues have the same top credit quality. Riding on the yield curve is a trading strategy that is based upon the yield curve and used for interest rate futures. Investors try to achieve capital gains by employing this strategy. If short term bonds offer a higher yield, then the curve is said to be inverted as shown in FIG. 37B.

The factors of face value, coupon, maturity, the issuer, yield, and price all influence bond values. The price is based on a lot of variables including interest rates, supply and demand, credit quality, maturity, and tax status. Nevertheless, the most important factor of bond price is the level of prevailing interest rates in the economy. When interest rates rise, the prices of bonds in the market fall, thereby raising the yield of the older bonds and bringing them into line with the newer bonds being issued with a higher coupon. When interest rates fall, the prices of bonds in the market rise, thereby lowering the yield of the older bonds and bringing them into line with the newer bonds being issued with a lower coupon. The price of a bond is the sum of the present values of all expected coupon payments plus the present value of the par value at maturity, which is complicated to calculate.

There is a need for a system which automatically translates offers and orders quotes into current yields, YTM, as well as custom-calibrated-value prices to assist each investor to make the person's own investment decision, rather than relying upon any analyst's or the investor's brain or intuition to put all the factors of face value, coupon, maturity, the issuer, yield, and price (based on variables including interest rates, supply and demand, and tax status, etc.) into consideration.

SUMMARY OF THE INVENTION

It is a purpose of this invention to provide a security rating system for facilitating transparent quantitative security ratings which evaluate both risks and returns.

It is another purpose of this invention to provide automated decision-making system for securities investors. The system automatically translates offers and orders quotes into current yields, YTM, as well as custom-calibrated-value prices to assist each investor to make the person's own investment decision, rather than relying upon any analyst's or the investor's brain or intuition to put all the factors of face value, coupon, maturity, the issuer, yield, and price (based on variables including interest rates, supply and demand, maturity, and tax status, etc.) into consideration.

The invention provides a security rating system having a security rating server and a security rating client connected with the security rating server via a communication network, wherein the security rating server has: a security information table storing means for storing a security information table that records security elements, i.e., data that constitute a security, for each security; a rating value calculating means for calculating a sum of rating contribution values for each security information table using a rating contribution value table, which stores contributing values for rating of securities belonging to the security elements as rating contribution values, and recording the sum of rating contribution values thus calculated as a rating value in the security information table; and a security information table transmitting means for transmitting the security information table to the security rating client when a security information table transmission request is received from the security rating client, and the security rating client has: a security information table transmission request transmitting means for transmitting the security information table transmission request to the security rating server, and a security information table receiving means for receiving the security information table from the security rating server.

The present invention also provides a security rating system having a security rating server and a security rating client as well as a managing client connected with the security rating server via a communication network, wherein The security rating server has: a security information table storing means for storing a security information table that records security elements, i.e., data that constitute a security, for each security; a rating value calculating means for calculating a sum of rating contribution values for each security information table using a rating contribution value table, which stores contributing values for rating of securities belonging to the security elements as rating contribution values, and recording the sum of rating contribution values thus calculated as a rating value in the security information table; a security information table transmitting means for transmitting the security information table to the security rating client when a security information table transmission request is received from the security rating client; and a rating contribution value table updating means for updating the rating contribution value to be recorded on the rating contribution value table when a rating contribution value table updating request is received from the managing client, the security rating client has: a security information table transmission request transmitting means for transmitting the security information table transmission request to the security rating server, and a security information table receiving means for receiving the security information table from the security rating server; and the managing client has a rating contribution value table updating request transmitting means for transmitting the rating contribution value table updating request to the security rating server.

The present invention also provides a security rating method used in a security rating system having a security rating server and a security rating client connected with the security rating server via a communication network, having: a security information table storing step for the security rating server to store a security information table that records security elements, i.e., data that constitute a security, for each security; a rating value calculating step for the security rating server to calculate a sum of rating contribution values for each security information table using a rating contribution value table, which stores contributing values for rating of securities belonging to the security elements as rating contribution values, and recording the sum of rating contribution values thus calculated as a rating value in the security information table; a security information table transmission request transmitting step for the security rating client to transmit a security information table transmission request to the security rating server; a security information table transmitting step for the security rating server to transmit the security information table to the security rating client when the security information table transmission request is received from the security rating client; and a security information table receiving step for the security rating client to receive the security information table from the security rating server.

The present invention also provides a security rating method used in a security rating system having a security rating server and a security rating client as well as a managing client connected with the security rating server via a communication network, having: a security information table storing step for the security rating server to store a security information table that records security elements, i.e., data that constitute a security, for each security; a rating value calculating step for the security rating server to calculate a sum of rating contribution values for each security information table using a rating contribution value table, which stores contributing values for rating of securities belonging to the security elements as rating contribution values, and record the sum of rating contribution values thus calculated as a rating value in the security information table; a security information table transmission request transmitting step for the security rating client to transmit a security information table transmission request to the security rating server; a security information table transmitting step for the security rating server to transmit the security information table to the security rating client when the security information table transmission request is received from the security rating client; a security information table receiving step for the security rating client to receive the security information table from the security rating server; a rating contribution value table updating request transmitting step for the managing client to transmit a rating contribution value table update request to the security rating server, and a rating contribution value table updating step for the security rating server to update the rating contribution value to be recorded on the rating contribution value table when a rating contribution value table updating request is received from the managing client.

The present invention also provides a security rating server connected with a security rating client via a communication network having: a security information table storing means for storing a security information table that records security elements, i.e., data that constitute a security, for each security; a rating value calculating means for calculating a sum of rating contribution values for each security information table using a rating contribution value table, which stores contributing values for rating of securities belonging to the security elements as rating contribution values, and recording the sum of rating contribution values thus calculated as a rating value in the security information table; and a security information table transmitting means for transmitting the security information table to the security rating client when receiving a security information table transmission request is received from the security rating client.

The present invention also provides a security rating server connected with a security rating client as well as a management client via a communication network having: a security information table storing means for storing a security information table that records security elements, i.e., data that constitute a security, for each security; a rating value calculating means for calculating a sum of rating contribution values for each security information table using a rating contribution value table, which stores contributing values for rating of securities belonging to the security elements as rating contribution values, and recording the sum of rating contribution values thus calculated as a rating value in the security information table; a security information table transmitting means for transmitting the security information table to the security rating client when receiving a security information table transmission request is received from the security rating client; and a rating contribution value table updating means for updating the rating contribution value to be recorded on the rating contribution value table when a rating contribution value table updating. request is received from the managing client.

The present invention also provides a security rating server control method for a security rating server connected with a security rating client via a communication network having: a security information table storing step for storing a security information table that records security elements, i.e., data that constitute a security, for each security; a rating value calculating step for calculating a sum of rating contribution values for each security information table using a rating contribution value table, which stores contributing values for rating of securities belonging to the security elements as rating contribution values, and recording the sum of rating contribution values thus calculated as a rating value in the security information table; and a security information table transmitting step for transmitting the security information table to the security rating client when a security information table transmission request is received from the security rating client.

The present invention also provides a security rating server control method for a security rating server connected with a security rating client as well as a management client via a communication network having: a security information table storing step for storing a security information table that records security elements, i.e., data that constitute a security, for each security; a rating value calculating step for calculating a sum of rating contribution values for each security information table using a rating contribution value table, which stores contributing values for rating of securities belonging to the security elements as rating contribution values, and recording the sum of rating contribution values thus calculated as a rating value in the security information table; a security information table transmitting step for transmitting the security information table to the security rating client when a security information table transmission request is received from the security rating client; and a rating contribution value table updating step for updating the rating contribution value to be recorded on the rating contribution value table when a rating contribution value table updating request is received from the managing client.

The present invention also provides a security rating server control program for causing a security rating server connected with a security rating client via a communication network to execute: a security information table storing step for storing a security information table that records security elements, i.e., data that constitute a security, for each security; a rating value calculating step for calculating a sum of rating contribution values for each security information table using a rating contribution value table, which stores contributing values for rating of securities belonging to the security elements as rating contribution values, and recording the sum of rating contribution values thus calculated as a rating value in the security information table; and a security information table transmitting step for transmitting the security information table to the security rating client when a security information table transmission request is received from the security rating client.

The present invention also provides a security rating server control program for causing a security rating server connected with a security rating client as well as a management client via a communication network to execute: a security information table storing step for storing a security information table that records security elements, i.e., data that constitute a security, for each security; a rating value calculating step for calculating a sum of rating contribution values for each security information table using a rating contribution value table, which stores contributing values for rating of securities belonging to the security elements as rating contribution values, and recording the sum of rating contribution values thus calculated as a rating value in the security information table; a security information table transmitting step for transmitting the security information table to the security rating client when a security information table transmission request is received from the security rating client; and a rating contribution value table updating step for updating the rating contribution value to be recorded on the rating contribution value table when a rating contribution value table updating request is received from the managing client.

The present invention also provides a computer-readable recording medium storing the security. rating server control programs.

The present invention also provides a security rating client connected with a security rating server via a communication network having: a security information table transmission request transmitting means for transmitting a security information table transmission request to the security rating server; and a security information table receiving means for receiving from the security rating server a security information table that records security elements, i.e., data that constitute a security, and a rating value, which is a sum of rating contribution values belonging to the security elements, for each security.

The present invention also provides a security rating client control method for a security rating client connected with a security rating server via a communication network having: a security information table transmission request transmitting step for transmitting a security information table transmission request to the security rating server; and a security information table receiving step for receiving from the security rating server a security information table that records security elements, i.e., data that constitute a security, and a rating value, which is a sum of rating contribution values belonging to the security elements, for each security.

The present invention also provides a security rating client control program for causing a security rating client connected with a security rating server via a communication network to execute: a security information table transmission request transmitting step for transmitting a security information table transmission request to the security rating server; and a security information table receiving step for receiving from the security rating server a security information table that records security elements, i.e., data that constitute a security, and a rating value, which is a sum of rating contribution values belonging to the security elements, for each security.

The present invention also provides a computer-readable recording medium storing the security rating client control program.

The present invention also provides a managing client connected with a security rating server via a communication network having: a rating contribution value table updating request transmitting means for transmitting to the security rating server a rating contribution value table updating request that requests to updates a rating contribution value stored in the rating contribution value table.

The present invention also provides a managing client control method for a managing client connected with a security rating server via a communication network having: a rating contribution value table updating request transmitting step for transmitting to the security rating server a rating contribution value table updating request that requests to updates a rating contribution value stored in the rating contribution value table.

The present invention also provides a managing client control program for causing a managing client connected with a security rating server via a communication network to execute: a rating contribution value table updating request transmitting step for transmitting to the security rating server a rating contribution value table updating request that requests to updates a rating contribution value stored in the rating contribution value table.

The invention also provides a computer-readable recording medium storing the managing client control program.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered with the accompanying drawings, in which like reference characters designate the same or similar parts throughout the several views, and wherein:

FIG. 2 is a diagram showing the constitution of a security rating server 100a.

FIG. 4 is a flowchart for describing a process executed by security rating server 100a.

FIG. 14 is a rating contribution value table with reference to security titles.

FIG. 15 is a rating contribution value table with reference to face values.

FIG. 16 is a rating contribution value table with reference to contents of public works.

FIG. 17 is a rating contribution value table with reference to planners.

FIG. 18 is a rating contribution value table with reference to executors.

FIG. 19 is a rating contribution value table with reference to guarantors.

FIG. 20 is a rating contribution value table with reference to redemption periods.

FIG. 21 is a rating contribution value table with reference to interest rates.

FIG. 22 is a rating contribution value table with reference to guaranteed limits.

FIG. 23 is a rating contribution value table with reference to dividends.

FIG. 24 is a rating contribution value table with reference to numbers of issued sheets.

FIG. 25 is a rating contribution value table with reference to numbers of transmissions.

FIG. 26 shows a front page.

FIG. 32 shows a table of three kinds of fixed rate financing instruments of the invention including the one for an Odaiba Casino Project.

FIG. 33 shows a table of three kinds of fixed rate financing instruments of the invention including the one for including a Japanese Highway Project.

FIG. 34 shows a table of two kinds of fixed rate financing instruments of the invention.

FIG. 35 shows conventional bond credit ratings.

FIG. 36 shows a bond price table generated by a conventional price-yield calculator.

DETAILED DESCRIPTION OF THE PREFERRED EMBODIMENTS

Figure 1:
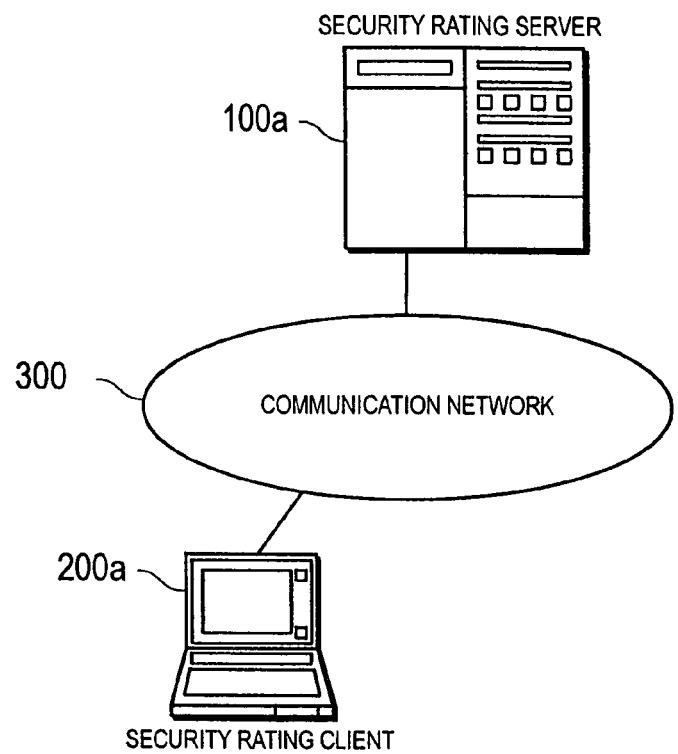
FIG. 1 is a diagram showing a security rating system according to a first embodiment of the present invention.

FIGS. 32-34 show examples of the fixed rate financing instruments which offer a dividend or are partially guaranteed by a third party to issuance as disclosed in U.S. patent application Ser. No.11/148,406 filed on June 9, 2005, which is incorporated herein by reference.

The fixed rate financing instrument has at least one issuing legal entity specified thereon which issues the financing instrument as evidence of debt to acquire funds to finance at least one operation, a face value specified thereon to be paid to the issuing legal entity in exchange for owning the financing instrument, a fixed interest rate specified thereon defining periodical interest payments to an instrument holder as a percentage of the face value, and at least one of (1) a guarantee ratio g being defined as a percentage of the interest payments and the face value to be paid back to the instrument holder as committed by at least one third party to issuance, if the legal entity defaults, 0<g<100, and (2) at least one of a fixed-rate dividend d and a fixed-amount dividend to be paid to the instrument holder after an operation financed through the financing instrument starts making profits, the fixed-rate dividend d being defined as a percentage of the profits to be paid to the instrument holder periodically, 0<d<100.

The security is a note, a stock, a treasury stock, a bond, a debenture, a certificate of interest or participation in a profit-sharing agreement or in oil, gas, or mineral royalty or lease, a collateral trust certificate, a pre-organization certificate or subscription, a transferable share, an investment contract, a voting-trust certificate, a certificate of deposit, for a security, a put, call, straddle, option, or privilege on a security, certificate of deposit, or group or index of securities, or a put, call, straddle, option, or privilege entered into on a national securities exchange relating to foreign currency, or an instrument commonly known as a 'security'; or a certificate of interest or participation in, temporary or interim certificate for, receipt for, or warrant or right to subscribe to or purchase, any of the foregoing; but shall not include currency or any note, draft, bill of exchange, or banker's acceptance which has a maturity at the time of issuance of not exceeding nine months, exclusive of days of grace, or any renewal thereof the maturity of which is likewise limited.

The price of a bond is the sum of the present values of all expected coupon payments plus the present value of the par value at maturity, which is complicated to calculate such that the system automatically translates offers and orders quotes into current yields, YTM, as well as custom-calibrated-value prices to assist each investor to make the person's own investment decision, rather than relying upon any analyst's or the investor's brain or intuition to put all the factors of face value, coupon, maturity, the issuer, yield, and price (based on variables including interest rates, supply and demand, maturity, and tax status, etc.) into consideration.

Figure 37A:
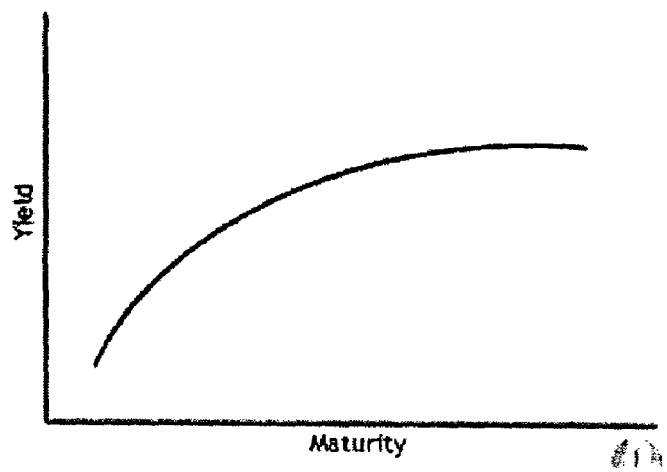
FIG. 37 shows example pf conventional bond yield curves.
Figure 37B:
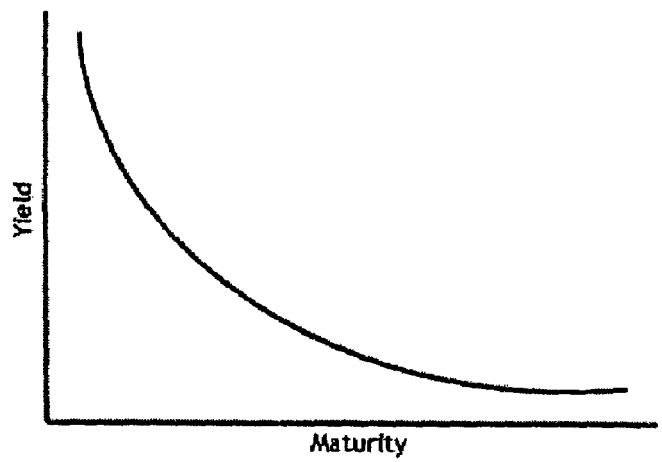

In other words, the system supports a quantitative analytical interface which automatically executes analytical functions, such as a price-yield calculator (FIG. 36), yield curves (FIG. 37), etc. to develop or test trade ideas before actual execution. The system supports a qualitative pricing interface which automatically executes a desired pricing model with respect to face value, coupon, maturity, the issuer, yield, prevailing interest rates in the economy, supply and demand, credit quality, maturity, and tax status as calibrated by a user. A satisfactory model may be chosen from any commercially available pricing model. However, the calibration to market data is left to the user to decide so as to implement an efficient routine. Alternatively, the user may pick a default calibration endorsed by famous investor, analysts, or breakage institutes.

(First Embodiment)

FIG. 1 is a diagram showing a security rating system according to a first embodiment of the present invention. As shown in FIG. 1, the security rating system according to the first embodiment of the present invention has a security rating server 100a, a communication network 300 connected to the security rating server 100a, and a security rating client 200a connected to communication network 300. Security rating server 100a is a server computer such as a workstation or a personal computer. Security rating client 200a is a client computer such as a desktop computer, personal computer, and PDA (Personal Digital Assistant). Communication network 300 is a network such as the Internet or a telephone network or a combination thereof. In the security rating system related to the first embodiment shown in FIG. 21, security rating server 100a and security rating client 200a communicate with each other via communication network 300.

Figure 2:
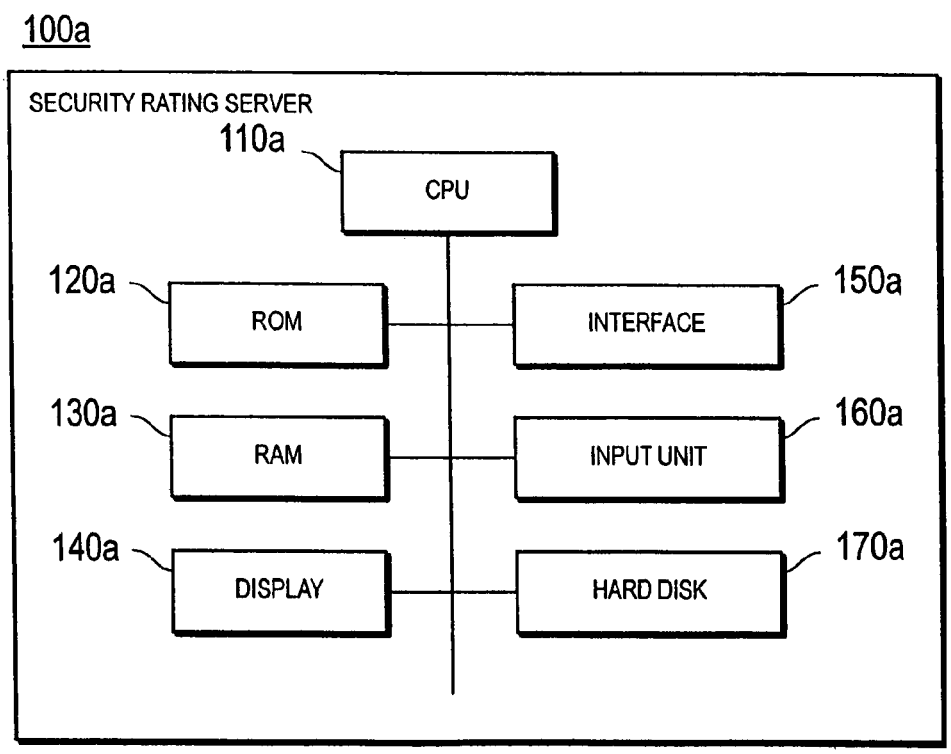

FIG. 2 is a diagram showing the constitution of a security rating server 100a shown in FIG. 1. As shown in FIG. 2, security rating server 100a has a CPU (Central Processing Unit) 110a for executing processes of security rating server 100a in accordance with programs, a ROM (Read Only Memory) 120a for storing various control programs, a RAM (Random Access Memory) 130a for temporarily storing data, a display 140a for displaying various data concerning process of security rating server 100a, an interface 150a such as an NIC (Network Interface Card) for executing communication controls via a communication network 300, an input unit 160a including a keyboard and a mouse for executing data input and operation instructions, and a hard disk 170a for storing execution programs such as an application program.

The process of security rating server 100a is performed by CPU 110a executing the execution program stored in a hard disk 170a. In this first embodiment, it will be described assuming the execution program is stored in hard disk 170a, but it is also possible in this invention to have the execution program stored in ROM 120a rather than hard disk 170a. In such a case, the process of security rating server 100a is performed by CPU 110a executing the execution program stored in ROM 120a.

Figure 3:
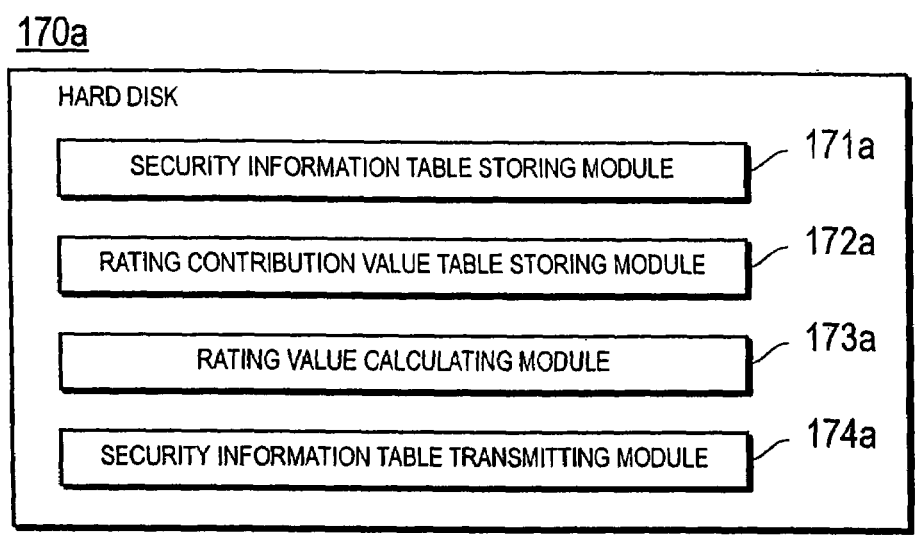
FIG. 3 is a diagram for describing each function of an execution program executed by a CPU of security rating server 100a according to the first embodiment.

FIG. 3 is a diagram for describing each function of the execution program stored in hard disk 170a by module. As shown in FIG. 3, the execution program has a security information table storing module 171a, a rating contribution value table storing module 172a, a rating value calculation module 173a, and a security information table transmitting module 174a. Security information table storing module 171a is software that stores the security information table into hard disk 170a. The security information table here means a table on which security elements are recorded for each security, examples of which are shown on FIGS. 32-34. The security elements are data that constitute a security such as Title of Security, Face Value. (.Yen.10,000), Contents of Public Work, Planner, Executor, Guarantor, Redemption Limit, Interest Rate (annual), Guaranteed Limit, Dividend, Number of Issues, Number of Transmissions, etc., shown in FIGS. 32-34.

Security rating value table storing module 172a is software that stores the security rating value table into hard disk 170a. The rating contribution value table here means a table on which rating contribution values are recorded for each security element, examples of which are shown on FIGS. 4-25.

The rating contribution value here means a contribution value that a security element provides for rating of a security; for example, if a security element, "Guarantor," happens to be "the Government of Japan," the security element called "the Government of Japan" provides a rating contribution value of 90 (see FIG. 19).

There are cases where more than two national or local governments or public institutions, more than two private enterprises, one national or local government or public institution and one private enterprise, one national or local government or public institution and more than two private enterprises, two or more national or local governments or public institutions and a private enterprise, or more than two national or local governments or public institutions and more than two private enterprises become planners or executioners of a public work to which funds acquired by securities are applied or guarantors of a bond.

The rating contribution value of a security element Planner, a security element Executioner and a security element guarantor in such cases will be the sum of rating contribution values the national or local government(s) or private enterprise(s) provide. In other words, if security element Executioners are "Metropolitan Government of Tokyo and a casino operating company in Las Vegas," this security element called "Metropolitan Government of Tokyo and a casino operating company in Las Vegas" provides a rating contribution value of 70+40=110 (FIG. 18).

Rating value calculating module 173a is software that calculates the sum of rating contribution values for each security information table using the rating contribution value table, which records contribution values for rating of a security belonging to security elements, and records the calculated sum of the rating contribution values as a rating value on the security information table. The rating value here means the rating of a security expressed with a numerical value. As mentioned above, the sum of rating contribution values for each security information table is the rating value.

Figure 5:
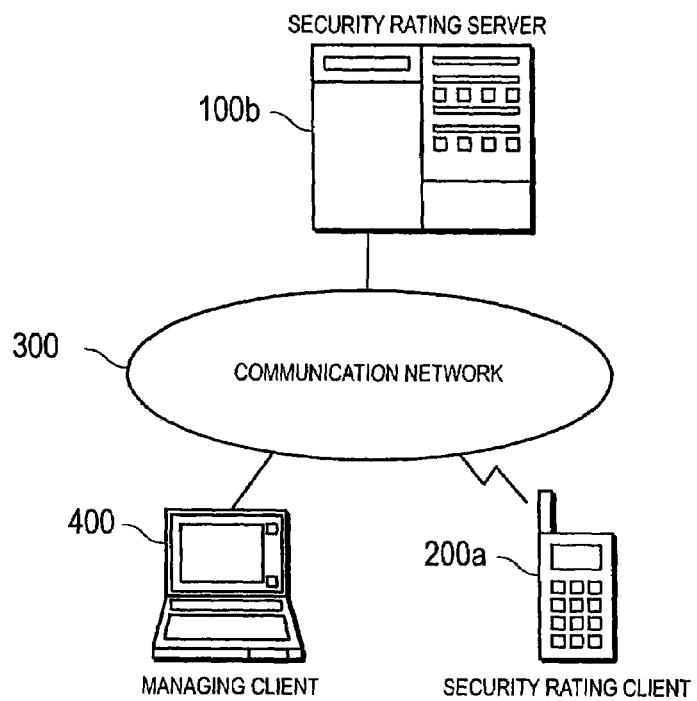
FIG. 5 is a diagram showing a security rating system according to a second embodiment of the present invention.

For example, in case of "Odaiba Casino Bond" with a face value of .Yen.1,000,000 shown in FIG. 5, "Title of Securities"=90, "Face Value (.Yen.10,000)"=70, "Contents of the Public Work"=90, "Planner"=90, "Executor"=110, "Guarantor"=80, "Redemption Period"=30, "Interest rate (annual)"=60, "Guaranteed Limit"=20, "Dividend"=0, "Number of Issued Sheets"=100, and "Number of Transmissions=100, so that the rating value becomes 90+70+90+90+110+80+30+60+20+0+100+100=840.

Figure 6:
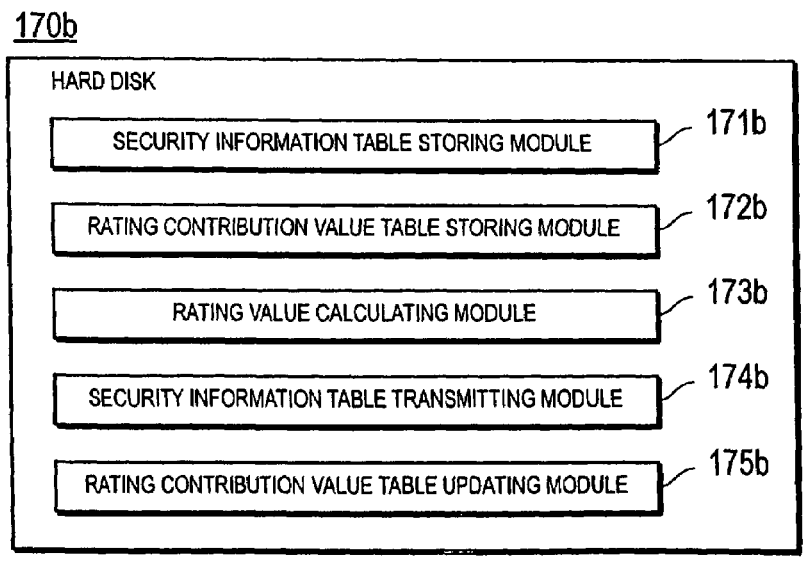
FIG. 6 is a diagram for describing each function of an execution program executed by a CPU of a security rating server 100b according to the second embodiment.

Also, for example, in case of Japan Highway Bond" with a face value of .Yen.1,000,000) shown in FIG. 6, "Title of Securities"=40, "Face Value (.Yen.10,000)"=70, "Contents of the Public Work"=40, "Planner"=0, "Executor"=50, "Guarantor"=90, "Redemption Period"=20, "Interest rate (annual)"=60, "Guaranteed Limit"=10, "Dividend"=100, "Number of Issued Sheets"=100, and "Number of Transmissions =80, so that the rating value becomes 40+70 +40+0+50+90+20+60+10+100+100+80=660.

As can be seen from the above, since "Odaiba Casino Bond" with a face value of .Yen.1,000,000) shown in FIG. 5 and "Japan Highway Bond" with a face value of .Yen.1,000,000) shown in FIG. 6 have identical security elements in terms of the face value (.Yen.1,000,000) and the interest rate (annual), they get the same rating contribution values, e.g., "Face Value (.Yen.1,000,000)"=70 and "Interest Rate (annual)"=60, for both the face value (.Yen. 1,000,000) and the interest rate (annual).

However, the two securities have differences in security elements other than the face value (.Yen. 1,000,000) and the interest rate (annual). Consequently, the rating values of the two securities are different (as noted above, the rating value of "Odaiba Casino Bond" with a face value of .Yen. 1,000,000 (FIG. 5) is 840, while the rating value of "Japan Highway Public Corporation" with a face value of .Yen.1,000,000 (shown in FIG. 6) is 660).

Security information table transmitting module 174a is software for transmitting security information tables shown in FIGS. 32-34 to security rating client 200a when it receives a security information table transmission request transmitted by security rating client 200a shown in FIG. 1. The security information table transmission request is transmitted by security rating client 200a to security rating server 100a when a user clicks the face value of a specific security with a mouse on the front page shown in FIG. 6, which has been transmitted by security rating server 100a shown in FIG. 1 to securing rating client 200a. The security information table transmission request is for security rating client 200a to request security rating server 100a to transmit the information related to the securities with the clicked face value.

Figure 4:
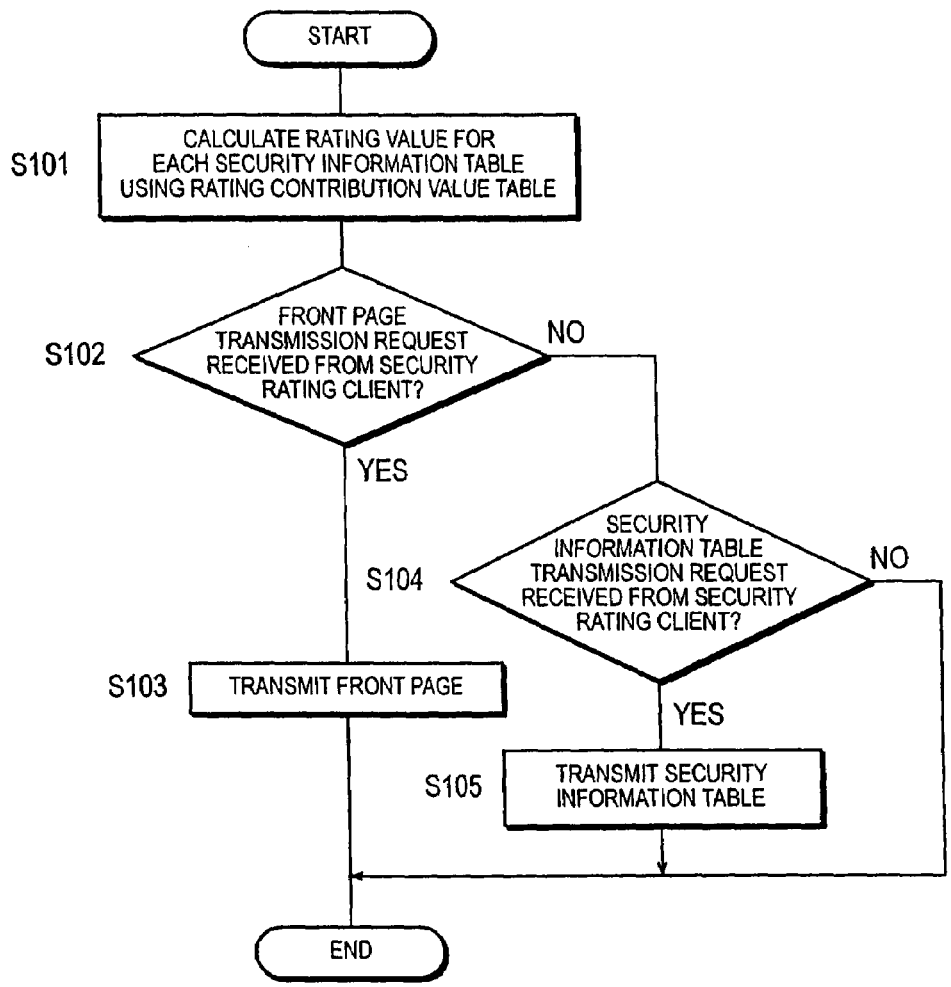

Security rating server 100a performs the process shown in FIG. 4 by means of executing the execution program consisting of the abovementioned modules on CPU 110a shown in FIG. 2. The process to be performed by security rating server 100a will be described below with reference to FIG. 4.

FIG. 4 is a flowchart used for describing the process performed by security rating server 100a. Security rating server 100a calculates the sum of rating contribution values on each security information table using the rating contribution table in step S101, and records the sum of the calculated rating contributions as a rating value on the security information table. Security rating server 100a determines whether it received a front page transmission request from security rating client 200a in step S102, and transmits the front page shown in FIG. 6 to security rating client 200a in step S103 if there was a front page transmission request from security rating client 200a.

Next, security rating server 100a determines whether it received a security information table transmission request from security rating client 200a in step S104, and transmits the security information table to security rating client 200a in step S105 if there was a security information table transmission request from security rating client 200a. Although a notebook personal computer ("PC") is indicated as security rating client 200a as shown in FIG. 1 in the security rating system according to the first embodiment of the present invention, the security rating client of the invention is not limited to a notebook PC. The security rating client of the present invention can be any type of client computers such as desktop PC, notebook PC, cellular telephones and PDA, as long as they can transmit security information table transmission requests to a security rating server and receive security information tables from the security rating server.

As described in the above, all securities will be provided the same rating contribution value if they share the same security element, e.g., "Guarantor" being "the Government of Japan" in the security rating system according to the first embodiment. Consequently, the security rating system according to the first embodiment of the present invention provides a means of objectively conducting the process of security rating.

(Second Embodiment)

FIG. 5 is diagram for describing a security rating system according to second embodiment of the present invention. As shown in FIG. 5, the security rating system according to the second embodiment of the present invention has a security rating server 100b, a communication network 300 connected to this security rating server 100b, a security rating client 200a, and a managing client 400 connected to this communication network 300.

The security rating system according to the second embodiment is different from the security rating system according to the first embodiment described above in that it has security rating server 100b instead of security rating server 100a used in the latter. Also, the security rating system according to the second embodiment is different from the security rating system according to the first embodiment described above in that it has managing client 400 while the latter has no managing client 400. The security rating system according to the second embodiment has the same constitution as the security rating system according to the first embodiment except the fact that it has security rating server 100b and managing client 400.

Security rating server 100b shown in FIG. 5 has the constitution shown in FIG. 2 similar to security rating server 100a shown in FIG. 1. However, the execution program being executed by a CPU (not shown) of security rating server 100b is different from the execution program executed by CPU 110a of security rating server 100a shown in FIG. 1 in that it has a rating contribution value table updating module 175b as shown in FIG. 6.

A security information table storing module 171b, a rating contribution value table storing module 172b, a rating value calculation module 173b, and a security information table transmitting module 174b in the execution program to be executed by the CPU (not shown) of security rating server 100b shown in FIG. 25 are identical software to security information table storing module 171a, rating contribution value table storing module 172a, rating value calculation module 173a, and security information table transmitting module 174a in the execution program to be executed by CPU 110a of security rating server 100a shown in FIG. 1 respectively.

Rating contribution value table updating module 175b in the execution program to be executed by the CPU (not shown) of security rating server 100b in FIG. 5 updates rating contribution values recorded on the rating contribution value tables shown in FIGS. 14-25 when rating contribution value table update requests are received from managing client 400 shown in FIG. 5.

The manager is a person who manages the rating contribution values recorded on the rating contribution value table. Therefore, the manager updates the rating contribution value for "constructing and operating a casino in Odaiba" in the rating contribution table related to the contents of the public work shown in FIG. 16 from 90 to 100, when the popularity of the public work concerning its contents of "constructing and operating a casino in Odaiba" among the citizens of Japan or the metropolitan Tokyo district increases. Also, the manger updates the rating contribution value of the "United States" in the rating contribution value table concerning the guarantor shown in FIG. 19 from 80 to 60 when the business trend deteriorates in the United States.

Therefore, a rating contribution value table update request transmitted by managing client 400 to security rating server 100b shown in FIG. 5 is for managing client 400 to request securities rating server 100b to update the rating contribution value table.

Figure 7:
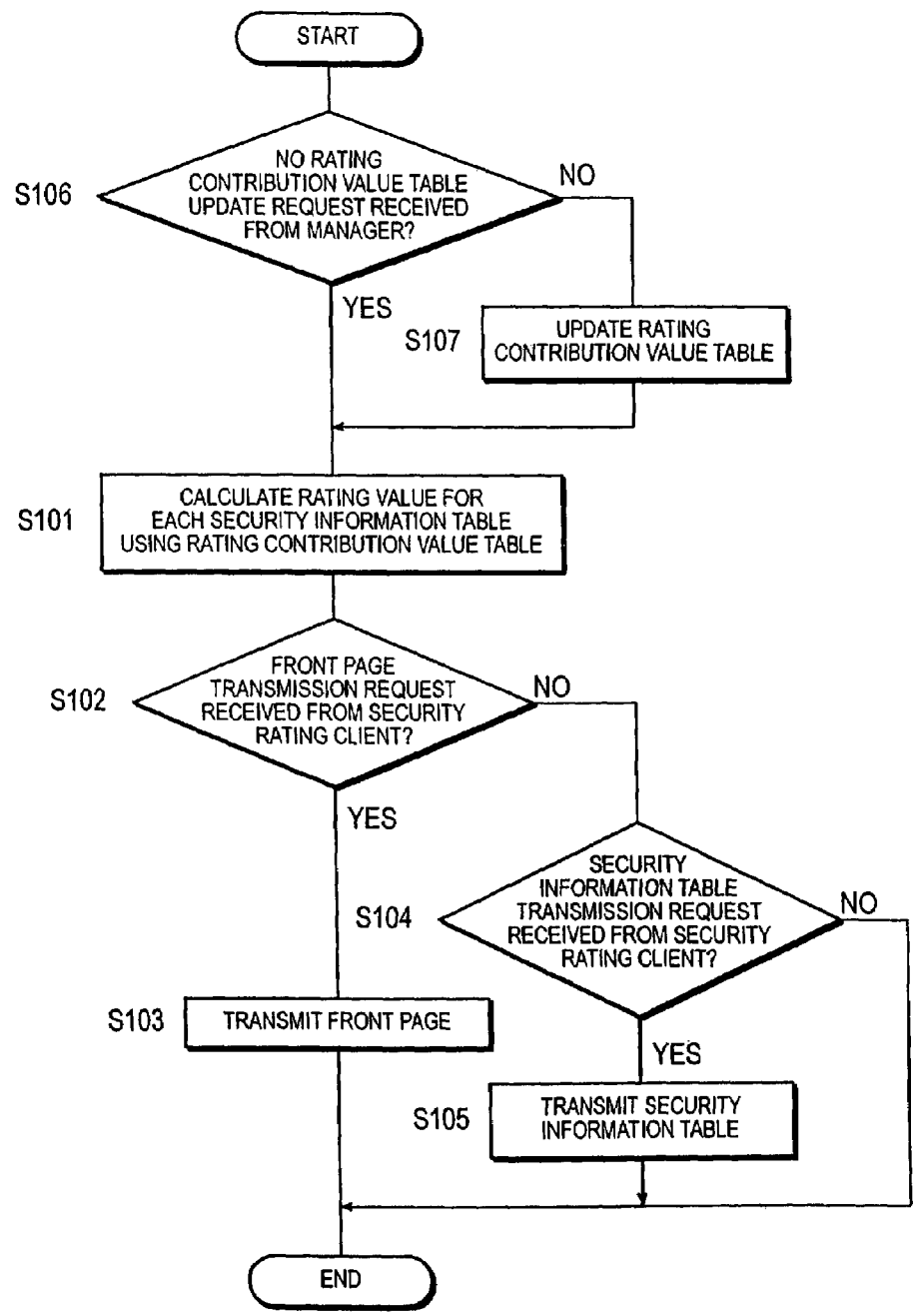
FIG. 7 is a flowchart for describing a process executed by security rating server 100b.

Security rating server 100b, which executes the execution program containing the rating contribution value table updating module 175b by means of CPU, performs the process shown in FIG. 7. Of the processes performed by security rating server 100b shown in FIG. 7, steps S101 through S105 are identical respectively to steps S101 through 105 performed by security rating server 100a in the first embodiment described in the above. In the second embodiment, security rating server 100b first determines in step S106 whether a rating contribution value table update request has been received from managing client 400, and updates the rating contribution values to be recorded on the rating contribution table if a rating contribution value table update request has been received. Security rating server 100b executes step S101 after step S106 and executes steps S102 through S105 similar to the first embodiment. Although a cellular telephone is indicated as security rating client 200a as shown in FIG. 5 in the security rating system according to the second embodiment of the present invention, the security rating client of the invention is not limited to a cellular telephone.

The security rating client of the present invention can be any type of client computers such as desktop PC, notebook PC, cellular telephones and PDA, as long as they can transmit security information table transmission requests to a security rating server and receive security information tables from the security rating server. Although a notebook PC is indicated as managing client 400 as shown in FIG. 5 in the security rating system according to the second embodiment of the present invention, the security rating client of the invention is not limited to a notebook PC. Therefore, the managing client of the present invention include various types of client computers such as desktop PC, notebook PC, cellular telephones, and PDA that are capable of transmitting rating contribution value table update requests to the security rating server.

As mentioned above, the manager can update the rating contribution value table using PC, PDA and the like in the security rating system according to the second embodiment of the present invention. Consequently, international situations, business trends and popularity of the project among residents can be reflected upon the rating contribution values of security elements in the security rating system according to the second embodiment of the present invention.

It is also possible in the security rating system according to the second embodiment to arrange a means of verifying the party trying to have an access to the rating contribution table so that only the manager can have an access to the rating contribution tables shown in FIGS. 14-25.

Consequently, such a verifying check will make the rating contribution value tables shown in FIGS. 4-25 inaccessible for viewing except by the manager, although the security information tables FIGS. 32-34 are open for viewing by all who are concerned. Thus, security rating client 200a can view the rating values of securities if security rating server 100b has a means of verifying, but not the rating contribution value belonging to each security element.

(Third Embodiment)

Figure 8:
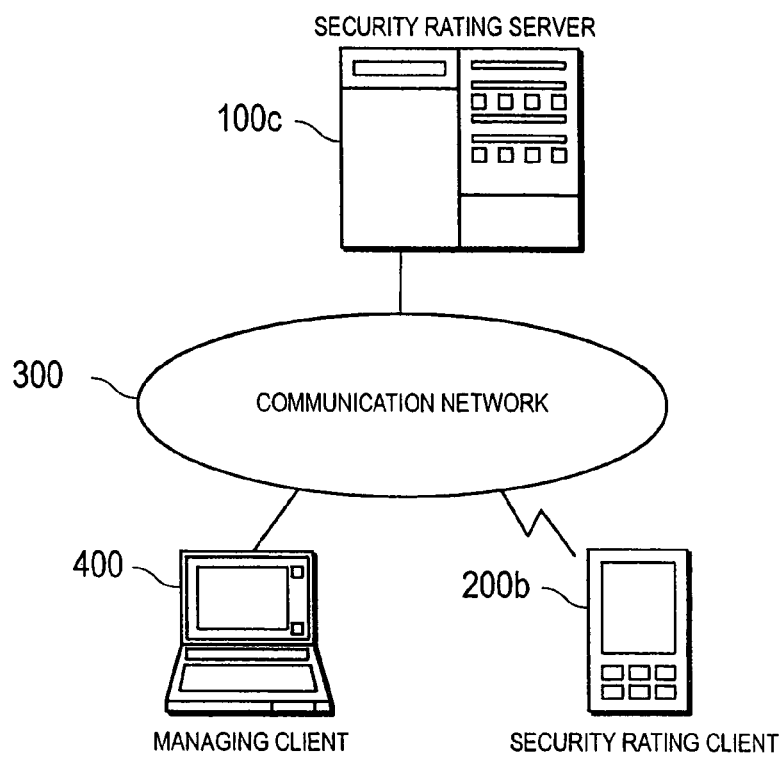
FIG. 8 is a diagram showing a security rating system according to a third embodiment of the present invention.

FIG. 8 is a diagram showing the third embodiment of the present invention. As shown in FIG. 8, the security rating system according to the third embodiment of the present invention has a security rating server 100c, a communication network 300 connected to this security rating server 100c, a security rating client 200b, and a managing client 400 connected to this communication network 300. The security rating system according to the third embodiment is different from the security rating system according to the second embodiment described above in that it has a security rating server 100c instead of security rating server 100b used in the latter. Also, the security rating system according to the third embodiment is different from the security rating system according to the second embodiment in that it has security rating client 200b while the latter has no security rating client 200b. The security rating system according to the third embodiment has the same constitution as the security rating system according to the second embodiment except the fact that it has security rating server 100c and managing client 200b. Security rating server 100c shown in FIG. 8 has the constitution shown in FIG. 2 similar to security rating server 100b shown in FIG. 5.

Figure 9:
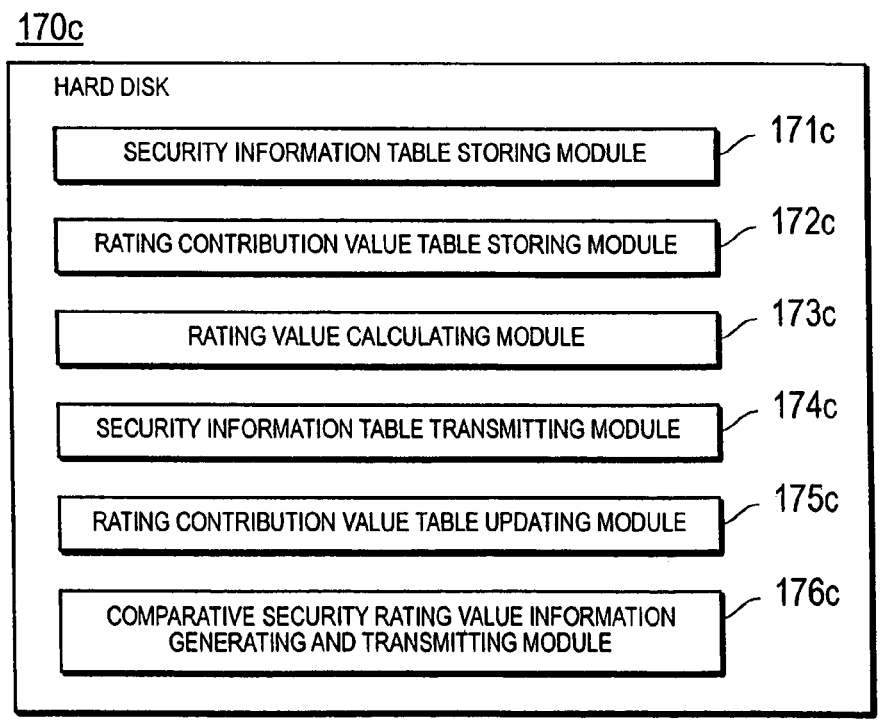
FIG. 9 is a diagram for describing each function of an execution program executed by a CPU of a security rating server 100c according to the third embodiment.

However, the execution program being executed by a CPU (not shown) of security rating server 100c is different from the execution program executed by CPU (not shown) of security rating server 100b shown in FIG. 5 in that it has a comparative security rating value information generating and transmitting module 176c as shown in FIG. 9. A security information table storing module 171c, a rating contribution value table storing module 172c, a rating value calculation module 173c, a security information table transmitting module 174c, and a rating contribution value table updating module 175c in the execution program to be executed by the CPU (not shown) of security rating server 100c shown in FIG. 8 are identical software to security information table storing module 171b, rating contribution value table storing module 172b, rating value calculation module 173b, security information table transmitting module 174b, and a rating contribution value table updating module 175b in the execution program to be executed by CPU (not shown) of security rating server 100b shown in FIG. 5 respectively.

Figure 28:
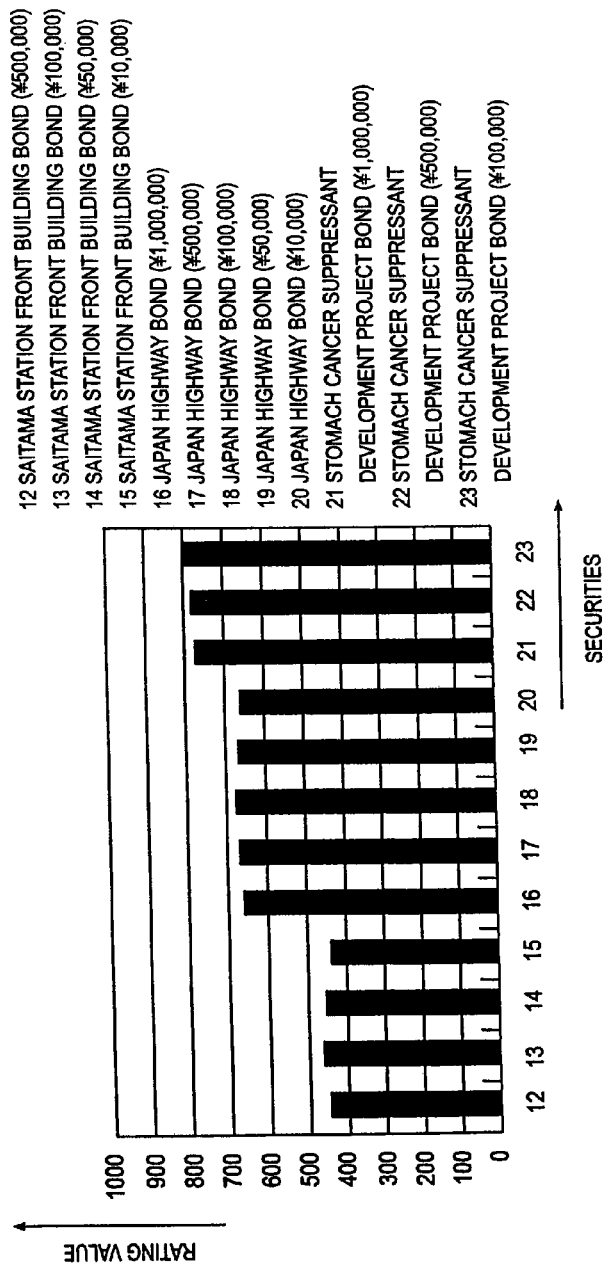
FIG. 28 is a bar chart of rating values.
Figure 29:
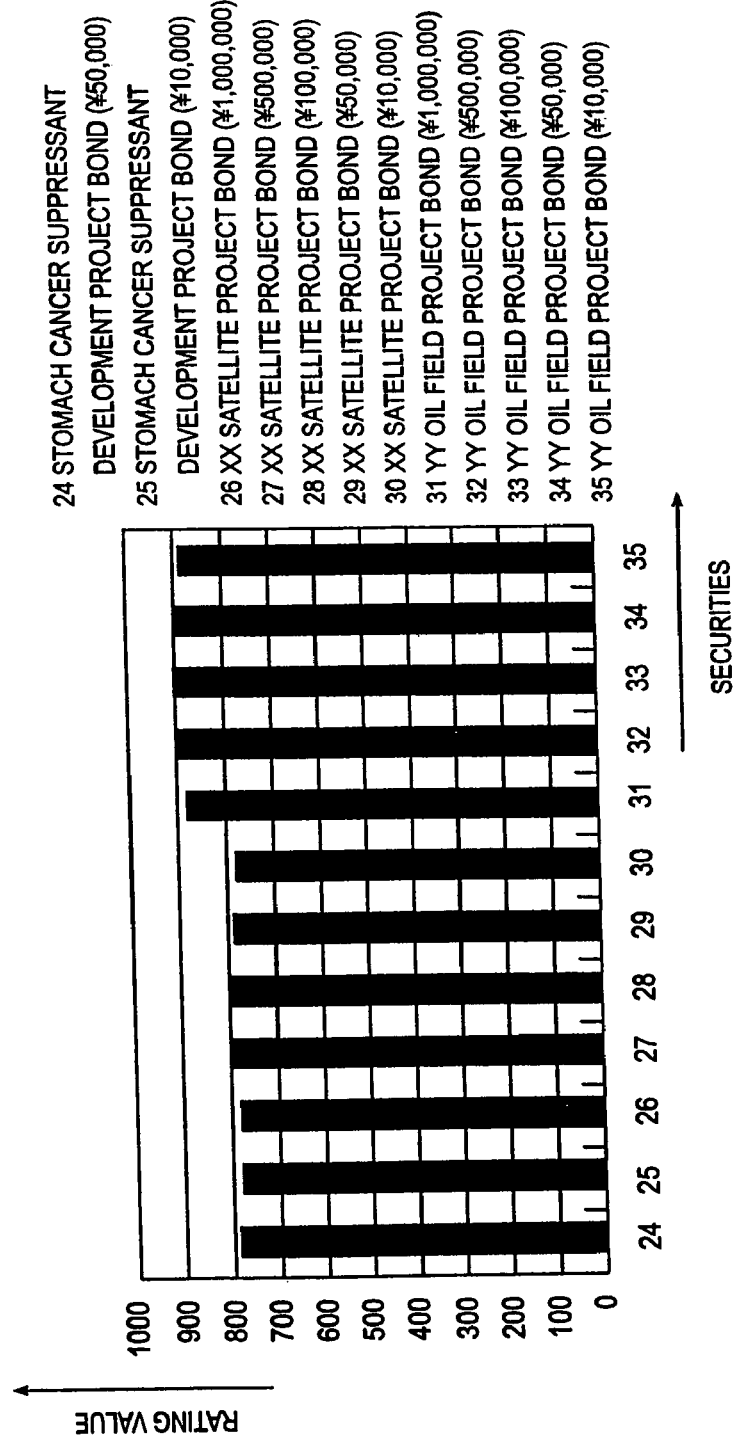
FIG. 29 is a bar chart of rating values.
Figure 30:
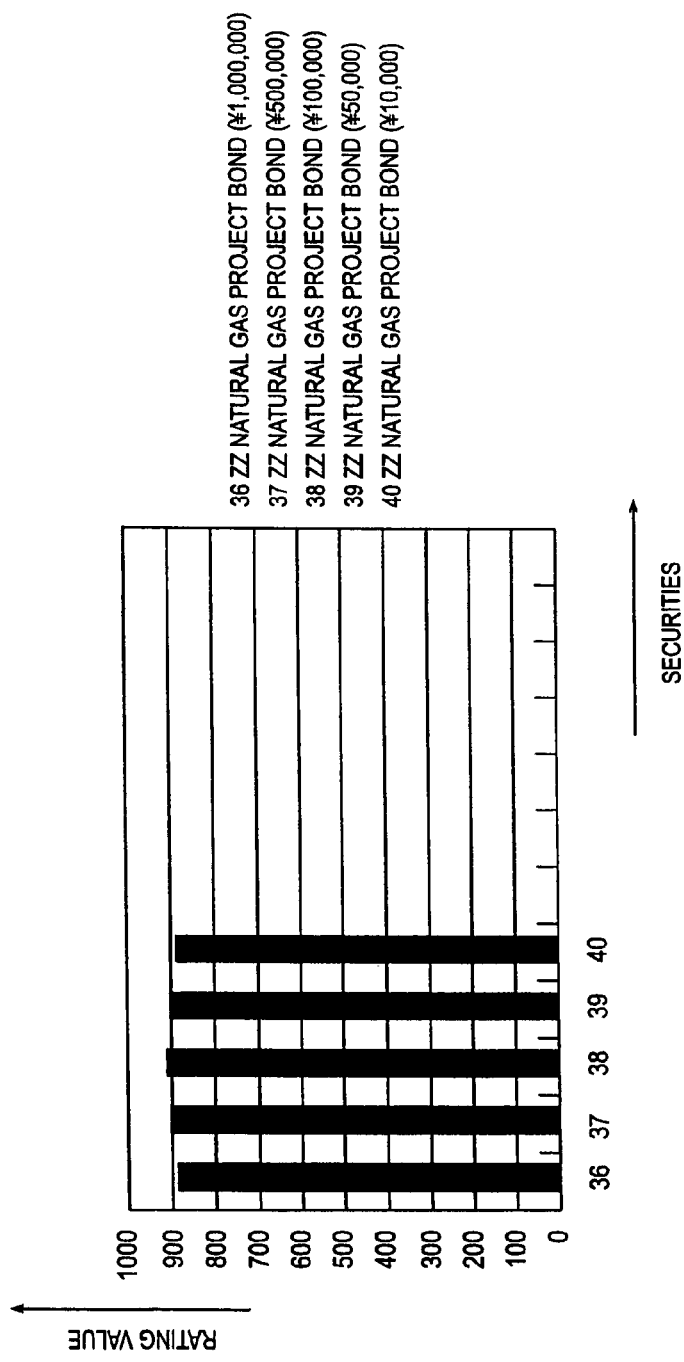
FIG. 30 is a bar chart of rating values.

Comparative security value information generating and transmitting module 176c in the execution program to be executed by the CPU (not shown) of security rating server 100c shown in FIG. 28 is software for generating comparative security rating value information upon receiving a comparative security rating value information transmission request from security rating client 200b shown in FIG. 8.

The comparative security rating value information transmission request is transmitted by security rating client 200b to security rating server 100c when a user clicks "Comparison of All Securities" with a mouse on the front page shown in FIG. 26, which has been transmitted by security rating server 100c shown in FIG. 8 to securing rating client 200b. The comparative security value information transmission request is for security rating client 200b to request security rating server 100c to transmit a comparative security rating value information.

Figure 31:
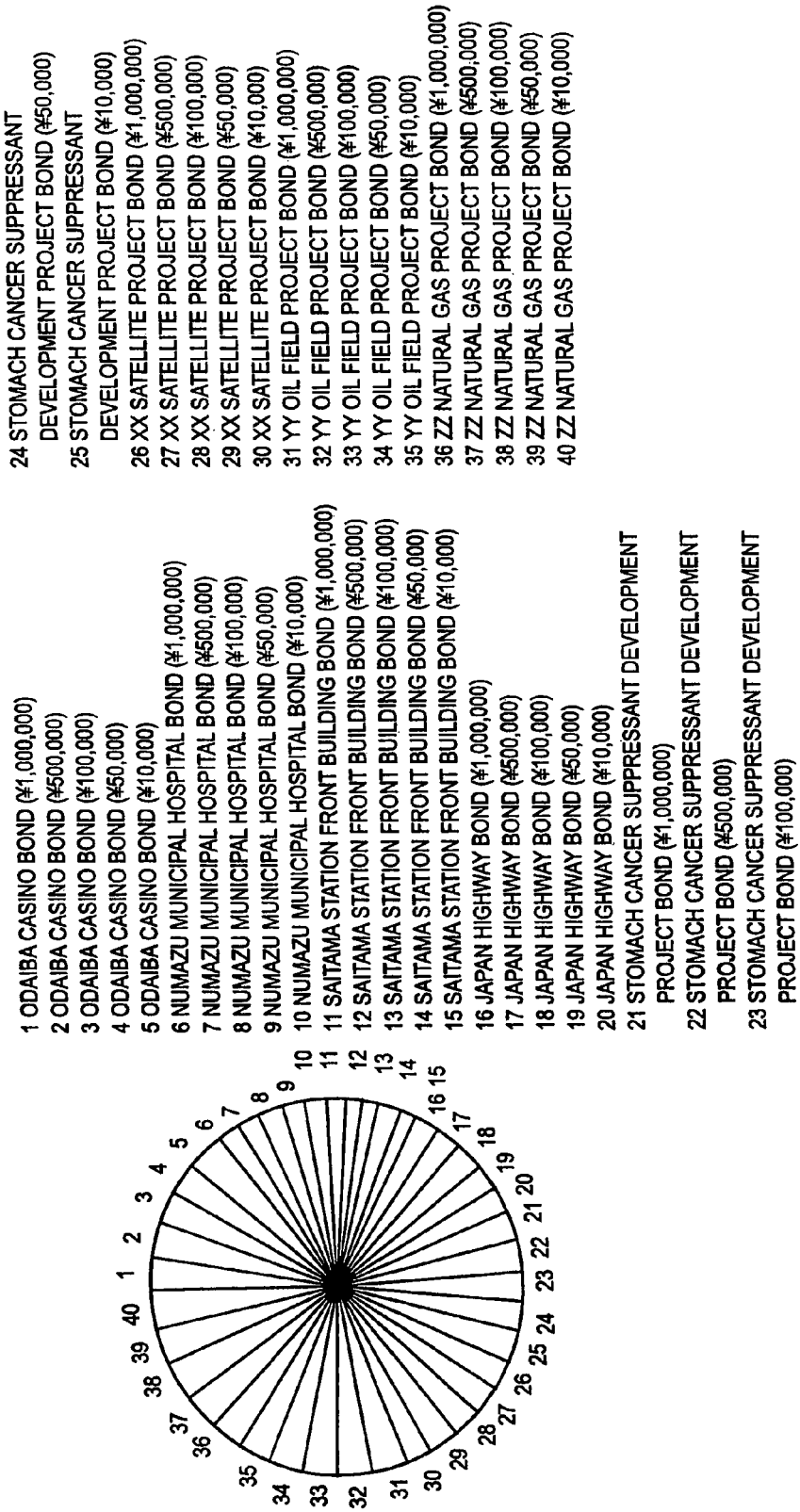
FIG. 31 is a pie chart of rating values.

The comparative security rating value information is information for comparing rating values of securities recorded on security information tables FIGS. 32-34 for a plurality of securities in such formats as bar graphs of rating value shown in FIG. 27-31 or pie charts of rating values shown in FIG. 31.

Comparative security rating value information generating and transmitting module 176c transmits the generated comparative security rating value information to security rating client 200b which transmitted the comparative security rating value information transmission request.

Figure 10B:
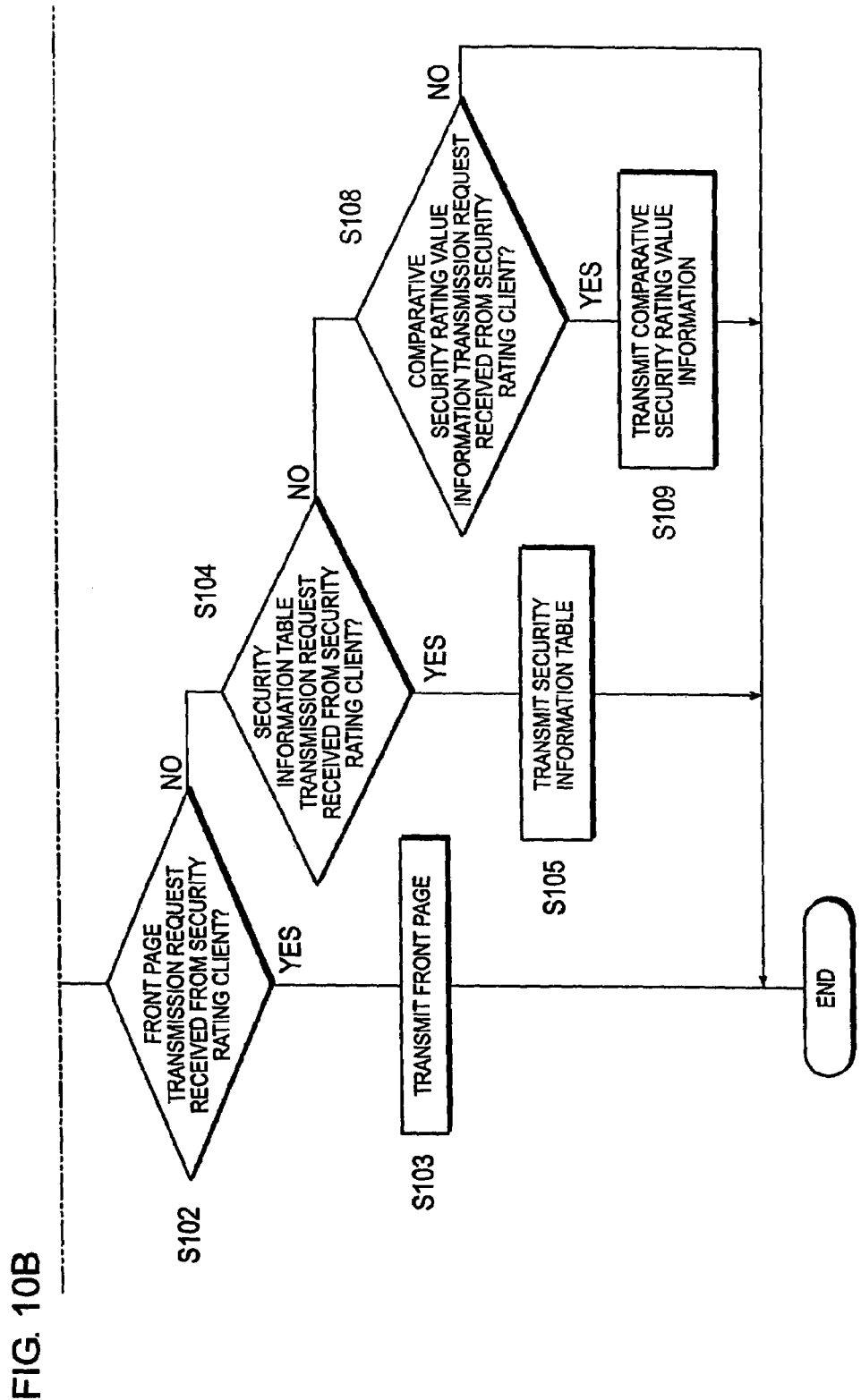
FIG. 10 is a flowchart for describing a process executed by security rating server 100c.

Security rating server 100c, which executes the execution program containing the comparative security rating value information generating and transmitting module 176c by means of CPU, performs the process shown in FIG. 10. Of the processes performed by security rating server 100c shown in FIG. 8, steps S101 through S107 are identical respectively to steps S101 through 107 performed by security rating server 100b in the second embodiment described in the above. In the third embodiment, security rating server 100c determines if a security information table transmission request is received from security rating client 200b in the step S104, and further determines if a comparative security rating value information transmission request is received from security rating client 200b in step S108 when no security information table transmission request is received from security rating client 200b.

Upon receiving a comparative security rating value information transmission request from security rating client 200b, security rating server 100c generates comparative security rating value information that compares rating values of securities recorded on security information tables for a plurality of securities and transmit it to security rating client 200b. Although a PDA is indicated as security rating client 200b as shown in FIG. 8 in the security rating system according to the third embodiment of the present invention, the security rating client of the invention is not limited to a PDA. The security rating client of the present invention can be any type of client computers such as desktop PC, notebook PC, cellular telephones and PDA, as long as they can transmit security information table transmission requests to a security rating server, receive security information tables from the security rating server, transmit comparative security rating value information transmission request to the security rating sever, and receive comparative security rating value information from the security rating server.

Although a cellular telephone is indicated as managing client 400 as shown in FIG. 8 in the security rating system according to the third embodiment of the present invention, the managing client of the invention is not limited to a cellular telephone. Therefore, the managing client of the present invention include various types of client computers such as desktop PC, notebook PC, cellular telephones, and PDA that are capable of transmitting rating contribution value table update requests to the security rating server.

As described above, investors can easily compare rating values of securities as the comparative security rating value information is transmitted from security rating server 100c to security rating client 200b by means of the security rating system according to the third embodiment of the present invention.

(Fourth Embodiment)

Figure 11:
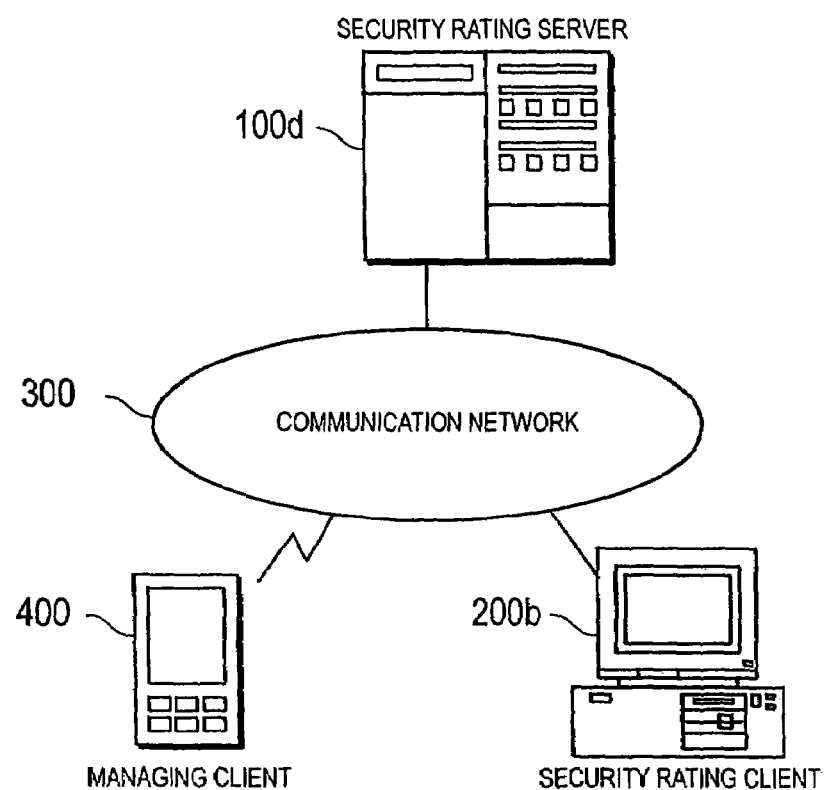
FIG. 11 is a diagram showing a security rating system according to a fourth embodiment of the present invention.

FIG. 11 is a diagram showing the fourth embodiment of the present invention. As shown in FIG. 11, the security rating system according to the fourth embodiment of the present invention has a security rating server 100d, a communication network 300 connected to this security rating server 100d, a security rating client 200b, and a managing client 400 connected to this communication network 300. The security rating system according to the fourth embodiment is different from the security rating system according to the third embodiment described above in that it has security rating server 100d instead of security rating server 100c used in the latter. The security rating system according to the fourth embodiment has the same constitution as the security rating system according to the third embodiment mentioned in the above except that it has security rating server 100d. Security rating server 100d shown in FIG. 11 has the constitution shown in FIG. 2 similar to security rating server 100c shown in FIG. 8.

Figure 12:
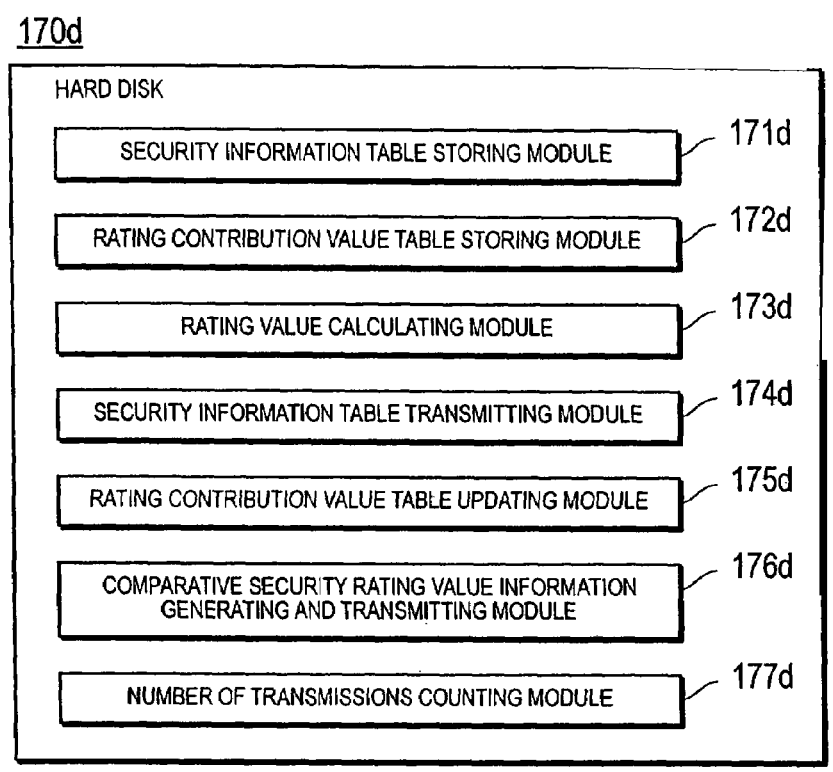
FIG. 12 is a diagram for describing each function of an execution program executed by a CPU of security rating server 100d according to the fourth embodiment.

However, the execution program being executed by a CPU (not shown) of security rating server 100d is different from the execution program executed by CPU (not shown) of security rating server 100c shown in FIG. 9 in that it has a number of transmissions counting module 177d as shown in FIG. 12.

A security information table storing module 171d, a rating contribution value table storing module 172d, a rating value calculation module 173d, a security information table transmitting module 174d, rating contribution value table updating module 175d, and comparable security rating value information generation and transmission module 176d in the execution program to be executed by the CPU (not shown) of security rating server 100d shown in FIG. 11 are identical software to security information table storing module 171c, rating contribution value table storing module 172c, rating value calculation module 173c, security information table transmitting module 174c, rating contribution value table updating module 175c, and comparable security rating value information generation and transmission module 176c in the execution program to be executed by CPU (not shown) of security rating server 100c shown in FIG. 9 respectively.

Number of transmissions counting module 177d in the execution program executed by CPU (not shown) of security rating server 100d shown in FIG. 11 increments by one the number of transmissions, which is a security element to be recorded on this security information table, when security information server 100*d* transmits a security information table to security rating client 200*b*. The number of transmissions here is the data indicating the number of frequencies a certain security information table is transmitted to the security rating client.

Figure 13B:
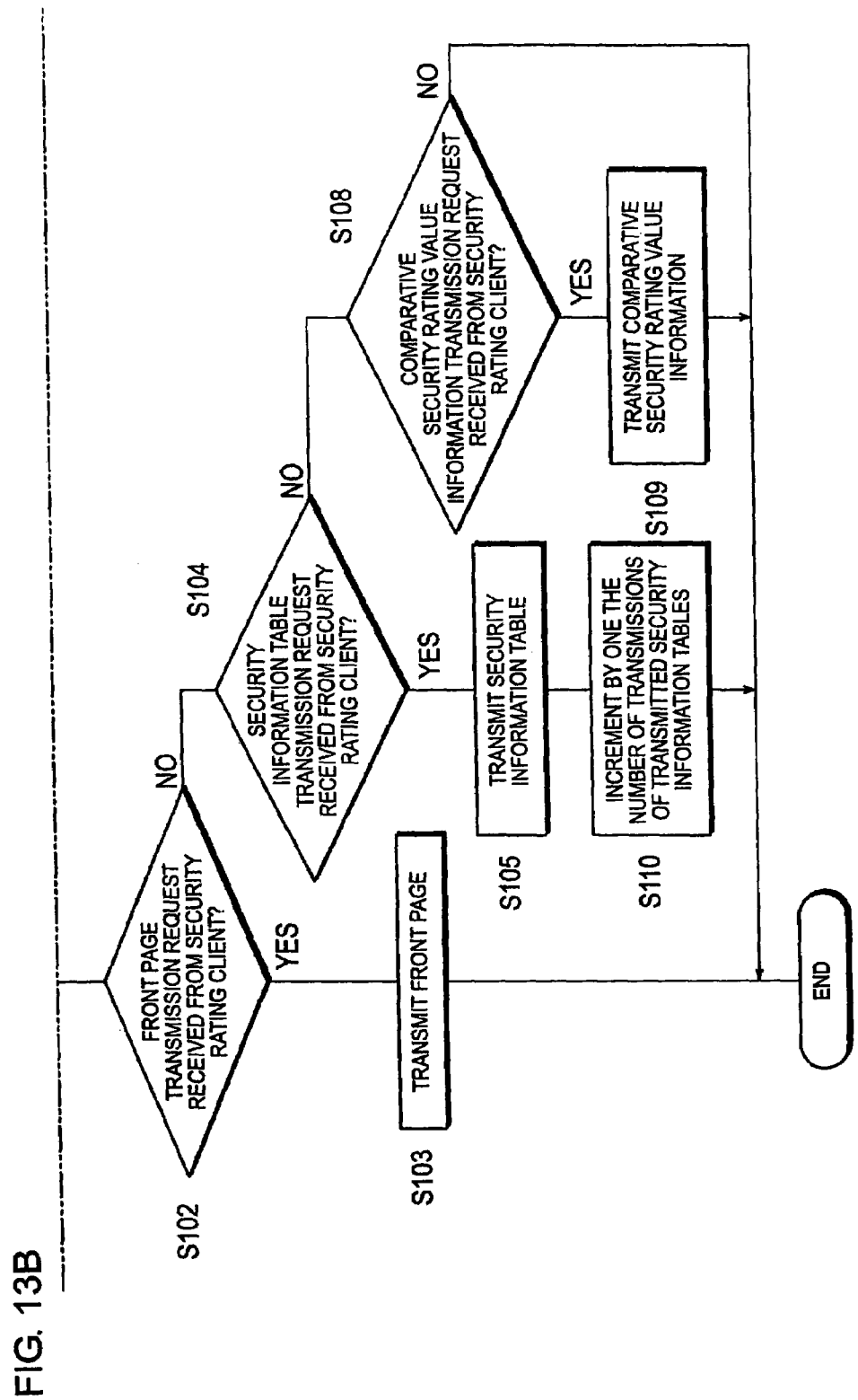
FIG. 13 is a flowchart for describing a process executed by security rating server
Figure 27:
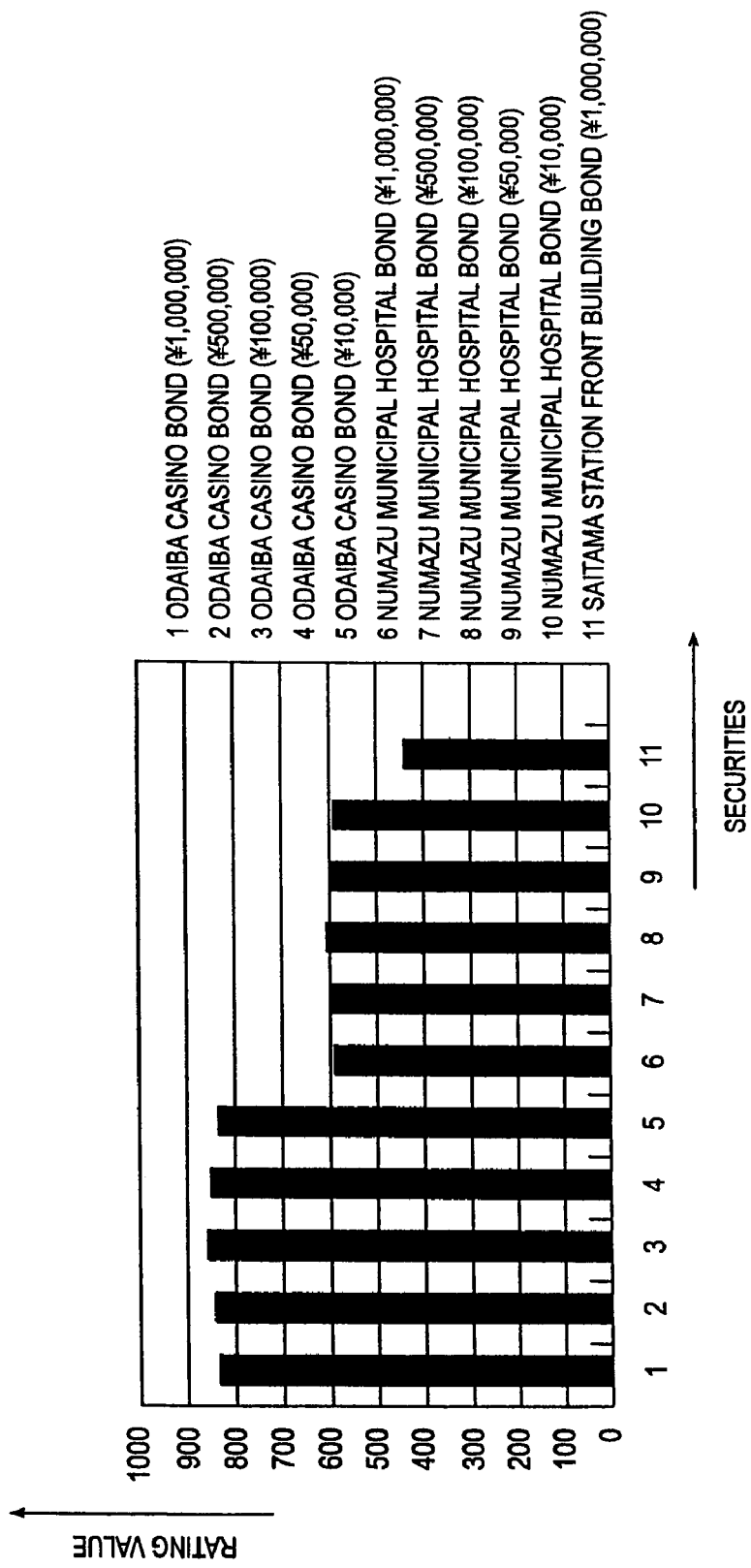
FIG. 27 is a bar chart of rating values.

Security rating server 100*d*, which executes the execution program containing the number of transmissions count module 177*d* by means of CPU, performs the process shown in FIG. 13. Of the processes performed by security rating server 100*d* shown in FIG. 11, steps S101 through S109 are identical respectively to steps S101 through 109 performed by security rating server 100*c* in the third embodiment described in the above. After transmitting the security information table to the security rating client in step S106 as mentioned above, security rating server 100*d* increments by one the number of transmissions, which is a security element to be recorded on the transmitted security information table in step S110.

Although a desktop PC is indicated as security rating client 200*b* as shown in FIG. 11 in the security rating system according to the fourth embodiment of the present invention, the security rating client of the invention is not limited to a desktop PC. The security rating client of the present invention can be any type of client computers such as desktop PC, notebook PC, cellular telephones and PDA, as long as they can transmit security information table transmission requests to a security rating server, receive security information tables from the security rating server, transmit comparative security rating value information transmission request to the security rating sever, and receive comparative security rating value information from the security rating server. Although a PDA is indicated as managing client 400 as shown in FIG. 11 in the security rating system according to the fourth embodiment of the present invention, the managing client of the invention is not limited to a PDA. Therefore, the managing client of the present invention include various types of client computers such as desktop PC, notebook PC, cellular telephones, and PDA that are capable of transmitting rating contribution value table update requests to the security rating server.

As described in the above, the number of transmissions of the security information table is incremented by one when the security information table is transmitted to the security rating client 200*b* in the security rating system according to the fourth embodiment of the present invention, and this number of transmissions is a security element and has a rating contribution value. Consequently, in the security rating system according to the fourth embodiment of the present invention, the number of cycles the security information table is transmitted to the security rating client, i.e., the number of accesses of the security information table made by the users can be reflected upon the rating value of the security.

Thus, the popularity of the project among the users can be reflected upon the rating value of the security based on the number of accesses in the security rating system according to the fourth embodiment.

In the first through fourth embodiments described above, each execution program can be stores in the managing client control program memory media such as CD-ROM (Compact Disc Read Only Memory) and DVD-ROM (Digital Versatile Disk Read Only Memory) and transferred or distributed.

Moreover, in the first through fourth embodiments described above, it is also possible to store modules of the execution program in different recording media in a distributed manner and transfer or distribute memory media containing one or more modules, although not containing the execution program itself.

Therefore, it is possible for a transferor of a recording medium on which an execution program is stored, or a transferor of a recording medium on which one or more module(s) is stored, to transfer the execution program or the one or more module(s) to a transferee without going through a network.

As can be seen from the above description, the present invention provides a means of assigning the same rating contribution value to all securities sharing an identical security element as far as the security element is concerned. Moreover, according to the present invention, the sum of rating contribution values of all security elements becomes the rating value that define the rating of the particular security with a numerical value.

Thus, according to the present invention, it is possible to provide a means of objectively rating a security in the sense that all securities with a common security element, for example, the "Guarantor," e.g., "the Government of Japan," are assigned with the same rating contribution value.

Moreover, investors can purchase the new financial products of the present invention that are neither stocks nor bonds, and seek profits in a new financial market that did not exist before, while business operators can obtain funds using these securities that are neither stocks nor bonds. The financial instruments according to the present invention will dig up latent private funds in private sectors to be invested into public works. Therefore, the present invention will help the national as well as local governments of various countries of the world to improve infrastructures such as roads and healthcare facilities even under a tight financial condition.

The invention provides a rating method for securities or fixed rate financing instruments comprising: providing at least one risk attribute and at least one return attribute shared by the securities or fixed rate financing instruments; grading among the securities or fixed rate financing instruments with grading numbers based on each of the at least one risk attribute and each of the at least one return attribute respectively; providing a weighting factor for each of the at least one risk attribute and each of the at least one return attribute; calculating a rating value for each one of the securities or fixed rate financing instruments based upon a formula involving the grading numbers and a weighting factor corresponding to each of the attributes; and publishing the attributes and the respective weighting factor, and the formula. The return attribute is an interest rate, a dividend yield, a yield to maturity, a project performance rating of an issuer, a price/earnings ratio, a periodical price performance percentage, a beta/volatility radio, a price/book ratio, a price/sales ratio, a Price/Earnings to Growth Ratio, or an estimated periodical Earnings per Share Growth.

The invention further provides a method for evaluating a price of a security or fixed rate financing instrument comprising: providing at least one risk attribute and at least one return attribute shared by the security or fixed rate financing instrument; retrieving real-time data of the security or fixed rate financing instrument, the real-time data including a face value, a coupon, a period prior to maturity, a credit rating of an issuer, a yield, and a yield to maturity; grading the real-time data with grading numbers based upon influence on price; providing a weighting factor for each of the real-time data; calculating an evaluated price for the security or fixed rate financing instrument based upon a formula involving the grading numbers and a weighting factor corresponding to each of the real-time data; and comparing the evaluated price with a real-time price to decide whether to sell, buy, or take no action regarding the security or fixed rate financing instrument.

The real-time data further include interest rates, supply and demand, a callable indication, a maturity term, and tax status. The real-time data further include a debt/equity ratio, a guarantee type, a financing purpose, a periodical transaction volume, a credit ranking of a guarantor, an industrial sector, a number of outstanding shares. The real-time data further include a project performance rating of an issuer, a price/earnings ratio, a periodical price performance percentage, a beta/volatility radio, a price/book ratio, a price/sales ratio, a Price/Earnings to Growth Ratio, or an estimated periodical Earnings per Share Growth.

The invention further provide a method for forming a new market comprising one of (1) generating and publishing ratings for securities or fixed rate financing instruments based upon the above-mentioned method, and (2) distributing an evaluating software for evaluating a price of a security or fixed rate financing instrument based upon the above-mentioned method.

These methods can be implemented by any computer software or hardware systems and networks, i.e., any systems, servers, methods, programs and computer-readable recording media, known to one skilled in the art.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A computer readable storage medium having machine-executable instructions encoded thereon for evaluating a price of a bond or fixed rate financing instrument, said instructions comprising:

a module for retrieving by a computer real-time data of said bond or fixed rate financing instrument, said real-time data including a price, at least one of a face value, an interest rate, a coupon, a period prior to maturity, a credit rating of an issuer, a current yield, a yield to maturity, a tax status, a callable indication, a maturity term, a debt/equity ratio, a guarantee type, a debt rating of the issuer or the guarantor, a credit rating of the issuer or the guarantor, a financing purpose, a periodical transaction volume, an industrial sector, and a number of outstanding issues, as well as at least one of a periodical price performance percentage, a profit margin of the issuer or the grantor, a sales revenue of the issuer or the grantor, and a revenue growth of the issuer or the grantor;

a module for grading by the computer or a user said real-time data with grading numbers based upon influence on price;

a module for providing by the computer or the user a weighting factor for each of said real-time data;

a module for calculating by the computer a rating for said bond or fixed rate financing instrument based upon a formula which aggregates a product of each of the grading numbers and the weighting factor corresponding to each of the real-time data; and a module for comparing by the computer or the user said rating with a real-time price to decide whether to sell, buy, or take no action regarding said bonds or fixed rate financing instruments, wherein said bond or fixed rate financing instrument comprises:

at least one issuing legal entity specified thereon which issues the financing instrument as evidence of debt to acquire funds to finance at least one operation;

a face value specified thereon to be paid to said issuing legal entity in exchange for owning the financing instrument;

a fixed interest rate specified thereon defining periodical interest payments to an instrument holder as a percentage of the face value; and at least one of (1) a guarantee ratio g being defined as a percentage of the interest payments and the face value to be paid back to the instrument holder as committed by at least one third party to issuance, if said legal entity defaults, 0< g <100, and (2) at least one of a fixed-rate dividend d and a fixed-amount dividend to be paid to the instrument holder after an operation financed through said financing instrument starts making profits, said fixed-rate dividend d being defined as a percentage of said profits to be paid to the instrument holder periodically, 0< d <100,and wherein the real-time data further includes at least one of the guarantee ratio g and the fixed-rate dividend d.

2. A computer-implemented method for evaluating a price of a bond or fixed rate financing instrument, comprising:

retrieving by a computer real-time data of said bond or fixed rate financing instrument, said real-time data including a price, at least one of a face value, an interest rate, a coupon, a period prior to maturity, a credit rating of an issuer, a current yield, a yield to maturity, a tax status, a callable indication, a maturity term, a debt/equity ratio, a guarantee type, a debt rating of the issuer or the guarantor, a credit rating of the issuer or the guarantor, a financing purpose, a periodical transaction volume, an industrial sector, and a number of outstanding issues, as well as at least one of a periodical price performance percentage, a profit margin of the issuer or the grantor, a sales revenue of the issuer or the grantor, and a revenue growth of the issuer or the grantor;

grading by the computer or a user said real-time data with grading numbers based upon influence on price;

providing by the computer or the user a weighting factor for each of said real-time data;

calculating by the computer a rating for said bond or fixed rate financing instrument based upon a formula which aggregates a product of each of the grading numbers and the weighting factor corresponding to each of the real-time data; and comparing by the computer or the user said rating with a real-time price to decide whether to sell, buy, or take no action regarding said bond or fixed rate financing instrument, wherein said bond or fixed rate financing instrument comprises:

at least one issuing legal entity specified thereon which issues the financing instrument as evidence of debt to acquire funds to finance at least one operation;

a face value specified thereon to be paid to said issuing legal entity in exchange for owning the financing instrument;

a fixed interest rate specified thereon defining periodical interest payments to an instrument holder as a percentage of the face value;

at least one of (1) a guarantee ratio g being defined as a percentage of the interest payments and the face value to be paid back to the instrument holder as committed by at least one third party to issuance, if said legal entity defaults, 0< g <100, and (2) at least one of a fixed-rate dividend d and a fixed-amount dividend to be paid to the instrument holder after an operation financed through said financing instrument starts making profits, said fixed-rate dividend d being defined as a percentage of said profits to be paid to the instrument holder periodically, 0< d <100 and wherein the real-time data further includes at least one of the guarantee ratio g and the fixed-rate dividend d.

* * * * *